(12) United States Patent
Woodward et al.

(10) Patent No.: US 11,309,970 B2
(45) Date of Patent: Apr. 19, 2022

(54) OPTICAL TRANSMITTER AND A METHOD FOR GENERATING LIGHT PULSES WITH VARIABLE INTENSITY AND VARIABLE PHASE WITHOUT AN OPTICAL MODULATOR

(71) Applicant: KABUSHIKI KAISHA TOSHIBA, Tokyo (JP)

(72) Inventors: Robert Ian Woodward, Cambridge (GB); Marco Lucamarini, Cambridge (GB); Zhiliang Yuan, Cambridge (GB); Andrew James Shields, Cambridge (GB)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/186,242

(22) Filed: Feb. 26, 2021

(65) Prior Publication Data

US 2022/0021458 A1    Jan. 20, 2022

(30) Foreign Application Priority Data

Jul. 17, 2020  (GB) .................................... 2011082

(51) Int. Cl.
  *H04B 10/50*  (2013.01)
  *H04B 10/548*  (2013.01)
  *H04B 10/508*  (2013.01)

(52) U.S. Cl.
  CPC ......... *H04B 10/504* (2013.01); *H04B 10/508* (2013.01); *H04B 10/548* (2013.01)

(58) Field of Classification Search
  CPC ... H04B 10/504; H04B 10/548; H04B 10/508
  (Continued)

(56) References Cited

U.S. PATENT DOCUMENTS 7,492,900 B2 *  2/2009  Yuan ..................... H04B 10/25
                                                  380/263
9,401,766 B2 *  7/2016  Yuan ..................... H04B 10/70
                    (Continued)

FOREIGN PATENT DOCUMENTS

CN    106603161 A    4/2017
CN    108540283 A    9/2018
                    (Continued)

OTHER PUBLICATIONS

Won-Young Hwang, "Quantum Key Distribution with High Loss: Toward Global Secure Communication", Physical Review Lett. 91, 057901 (2003) pp. 1-4.

(Continued)

*Primary Examiner* — Abbas H Alagheband
(74) *Attorney, Agent, or Firm* — Oblon, McClelland, Maier & Neustadt, L.L.P.

(57) ABSTRACT

An optical source including: a phase-randomised light source including a master light source configured to intermittently generate master light pulses; a slave light source optically coupled to the master light source and configured to receive the master light pulses, and that generates a sequence of slave light pulses during each period of time that a master light pulse is received; and an interferometer optically coupled to the slave light source and configured to receive sequences of slave light pulses, delay the received sequences by the first time interval to form delayed sequences of slave light pulses, interfere the received sequences with the delayed sequences, such that pulses from a received sequence interfere with adjacent pulses of the delayed sequence, and output interfered pulses including first and second output pulses that have a first and second predetermined amplitude respectively and a predetermined relative phase between them.

20 Claims, 13 Drawing Sheets

(58) Field of Classification Search
USPC .......................................................... 398/188
See application file for complete search history.

(56) References Cited

U.S. PATENT DOCUMENTS

| | | | |
|---|---|---|---|
| 9,685,754 B2* | 6/2017 | Puppe | H01S 3/10046 |
| 9,696,133 B2* | 7/2017 | Yuan | G01B 9/0201 |
| 9,876,580 B2* | 1/2018 | Yuan | H04B 10/70 |
| 10,784,651 B2* | 9/2020 | Marangon | G01J 11/00 |
| 10,972,187 B1* | 4/2021 | Tang | H04B 10/508 |
| 2011/0228255 A1* | 9/2011 | Li | G01K 11/32 |
| | | | 356/33 |
| 2013/0036145 A1* | 2/2013 | Pruneri | G06F 7/588 |
| | | | 708/191 |
| 2015/0304051 A1* | 10/2015 | Yuan | H04B 10/70 |
| | | | 398/188 |
| 2016/0047643 A1* | 2/2016 | Yuan | H01S 5/4006 |
| | | | 398/25 |
| 2017/0237505 A1* | 8/2017 | Lucamarini | H04B 10/5161 |
| | | | 398/185 |

FOREIGN PATENT DOCUMENTS

| | | |
|---|---|---|
| GB | 2525399 A | 10/2015 |
| GB | 2529228 B | 8/2017 |

OTHER PUBLICATIONS

Z. L. Yuan, et al., "Directly Phase-Modulated Light Source", Physical Review X 6, 031044 (2016) pp. 1-8.

Combined Great Britain Office Action and Search Report dated Apr. 16, 2021 in Great Britain Patent Application No. 2011082.1, 13 pages.

* cited by examiner

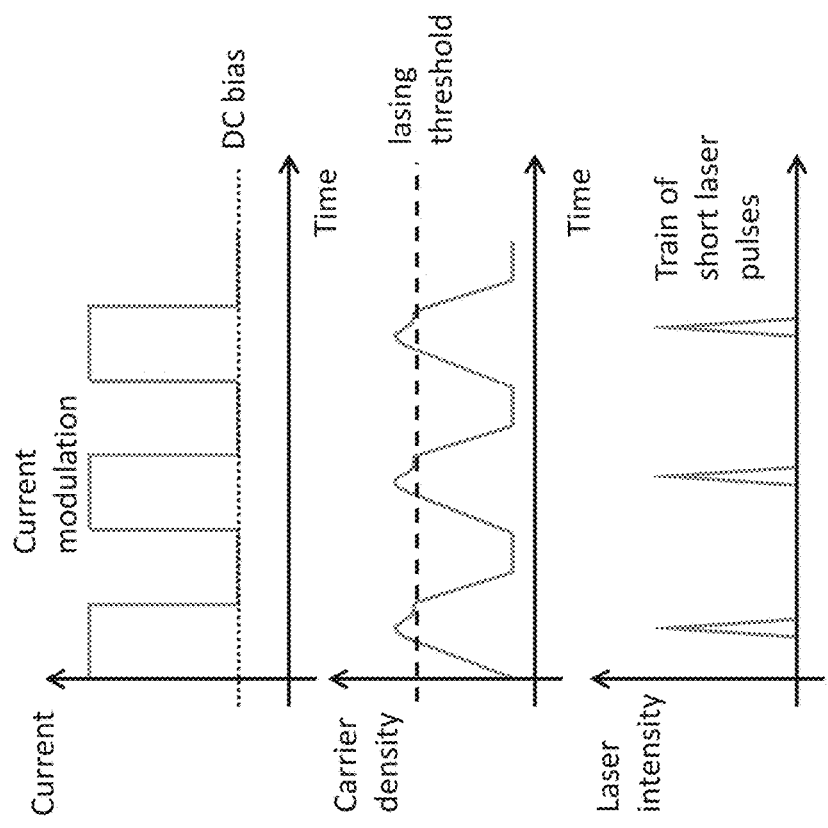
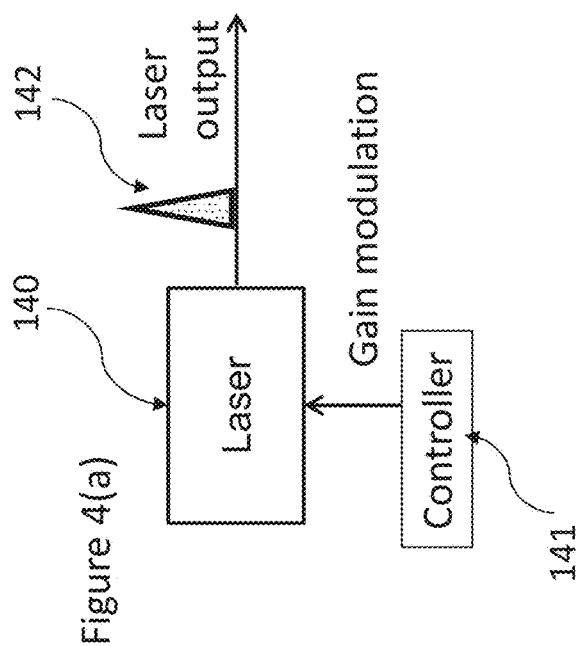
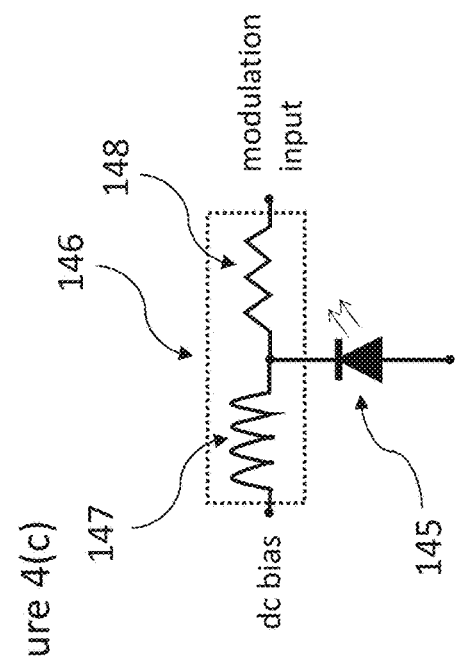

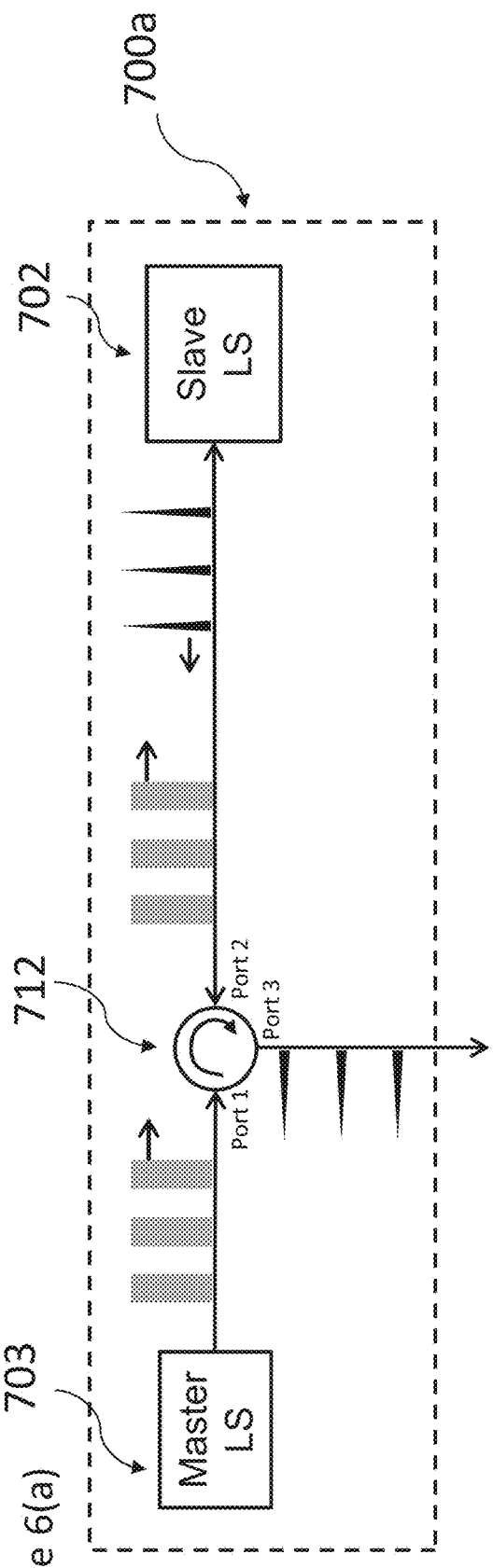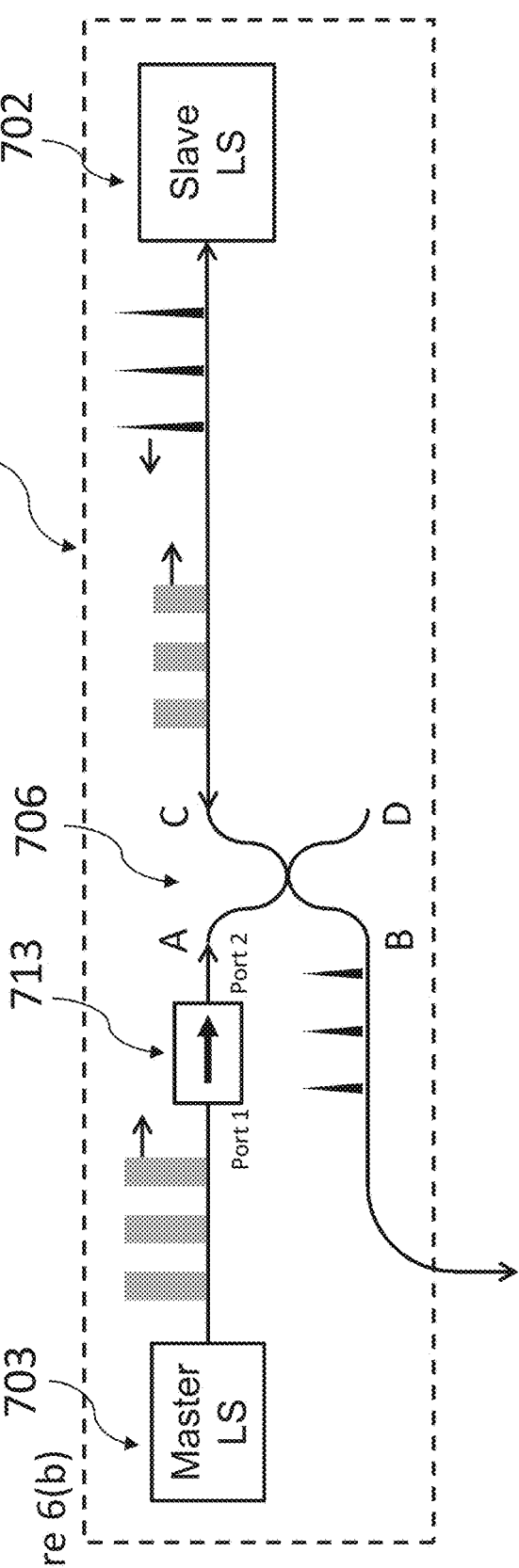

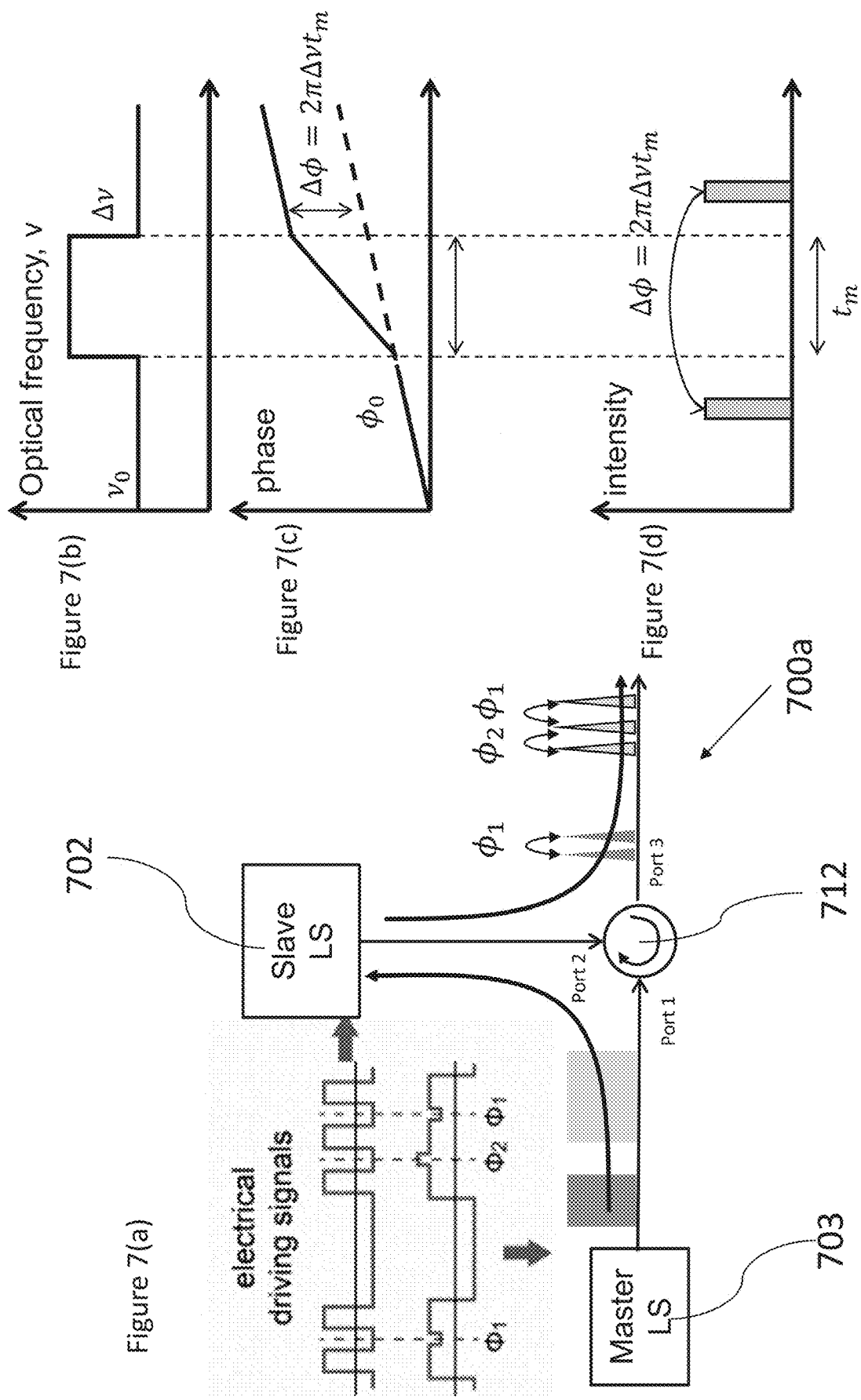

US 11,309,970 B2

OPTICAL TRANSMITTER AND A METHOD FOR GENERATING LIGHT PULSES WITH VARIABLE INTENSITY AND VARIABLE PHASE WITHOUT AN OPTICAL MODULATOR

CROSS-REFERENCE TO RELATED APPLICATIONS

This application is based upon and claims the benefit of priority from prior United Kingdom Application number 2011082.1 filed on 17 Jul. 2020, the entire contents of which are incorporated herein by reference.

FIELD

Embodiments herein relate generally to an optical source, a method for generating optical pulses, and a quantum communication system and method.

BACKGROUND

Sources of pulses of light are used in a wide range of applications such as for optical communications. In particular, sources of pulses of light have utility in quantum communications systems, for example in quantum key distribution (QKD), measurement device independent QKD (MDI-QKD), or twin-field QKD (TF-QKD). QKD is a technique which results in the sharing of cryptographic keys between two parties; a transmitter, often referred to as "Alice", and a receiver, often referred to as "Bob". Information is transmitted between "Alice" and "Bob" by encoded single quanta, such as single photons. Photons carry information encoded upon a property of the photons, such as polarisation, phase, or energy/time. The attraction of this technique is that it provides a test of whether any part of the key can be known to an unauthorised eavesdropper, often referred to as "Eve". In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

There is a continuing need to improve the sources of pulses used in applications such as optical communications and in quantum communication systems.

BRIEF DESCRIPTION OF THE FIGURES

Systems and methods in accordance with non-limiting examples will now be described with reference to the accompanying figures in which:

FIG. 4(*a*) is a schematic illustration of gain-switched laser according to an example;

FIG. 4(*b*) is a schematic illustration of the gain modulation of a semiconductor gain-switched laser;

FIG. 4(*c*) is a schematic illustration of an electrical driving circuit for a semiconductor gain-switched laser;

FIG. 6(*a*) is a schematic illustration of a phase-randomised light source in accordance with an example;

FIG. 6(*b*) is a schematic illustration of a phase-randomised light source in accordance with another example;

FIG. 7(*a*) shows the light source of FIG. 6 (*a*) where the relative phase between subsequent emitted light pulses is modulated;

FIG. 7(*b*) is a schematic illustration of the change in the optical frequency of a master laser when a small perturbation is applied to the electrical driving signal;

FIG. 7(*c*) is a schematic illustration of the optical phase trajectories with and without the perturbation of the master laser;

FIG. 7(*d*) is a schematic illustration of two slave pulses emitted by a slave laser during the time that a single master pulse has been injected;

FIG. 10(*b*) shows the electrical signal applied to the slave laser of FIG. 9;

FIG. 10(*c*) shows the optical pulses emitted by the light source of FIG. 9 when the electrical signal of FIGS. 10 (*a*) and 10 (*b*) are applied;

FIG. 10(*d*) shows the interfered optical pulses output by the optical system of FIG. 9;

FIG. 11 (*b*) shows a heatmap illustrating the amplitude of a late pulse emitted by the optical system of FIG. 9;

FIG. 11 (*c*) shows a heatmap illustrating the relative phase difference between the early pulse and the late pulse emitted by the optical system of FIG. 9;

DETAILED DESCRIPTION

Figure 1:
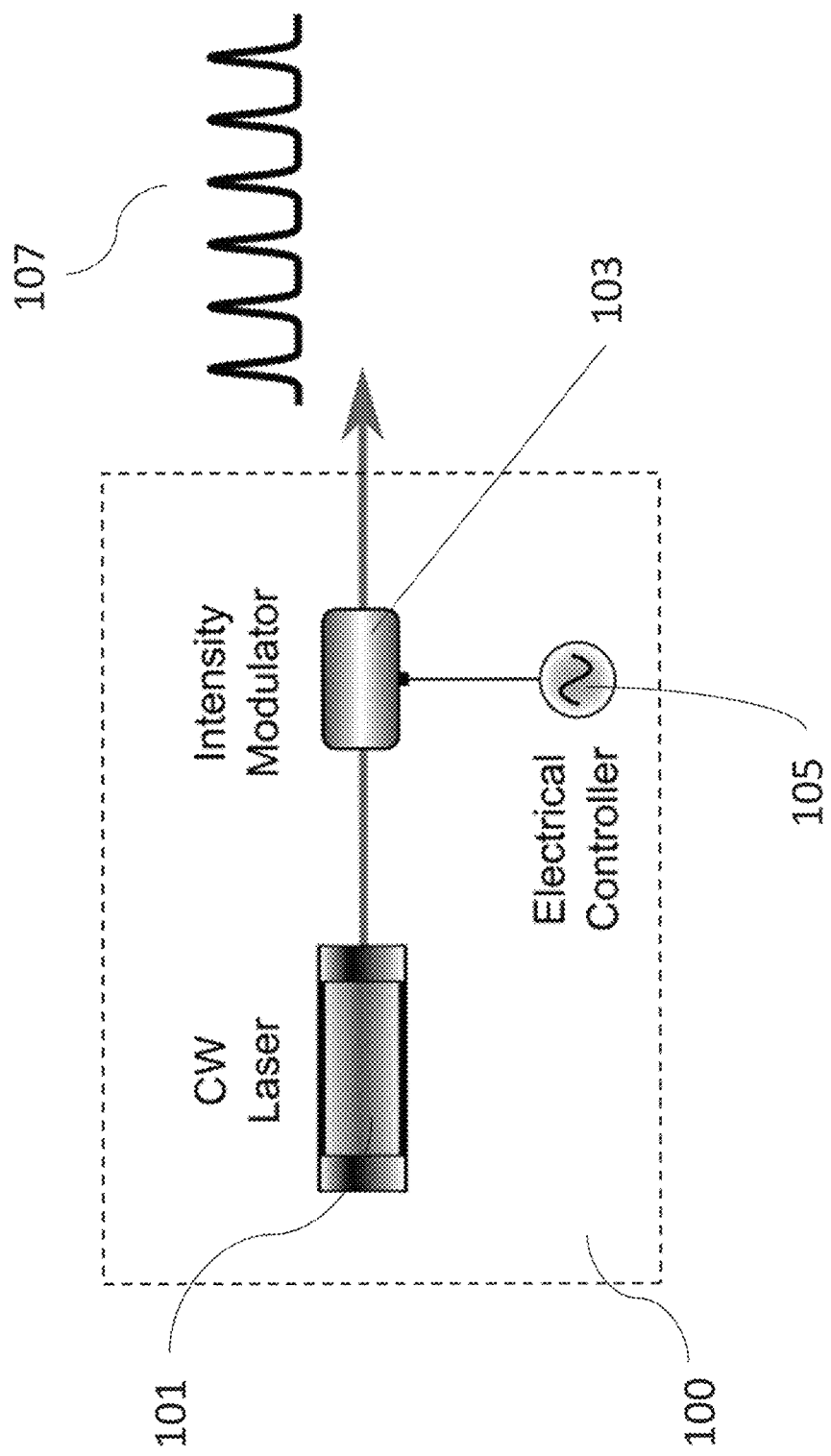
FIG. 1 is a schematic illustration of a source of pulses of light according to an example.

According to a first aspect, there if provided an optical source comprising:
  a phase-randomised light source, the phase randomised light source further comprising:
    a master light source configured to intermittently generate master light pulses, wherein the phase of each generated master light pulse has a random relationship with the phase of each subsequently generated master light pulse, and wherein a first control signal is applicable to the master light source such that the master light source intermittently generates master light pulses, wherein the first control signal comprises a first and a second modulation feature in the period of time that one master light pulse is generated, wherein each phase modulation feature comprises a perturbation in the control signal applied to the master light source;

a slave light source, wherein the slave light source is optically coupled to the master light source and is configured to receive master light pulses, and wherein a second control signal is applicable to the slave light source to cause the slave light source to generate a sequence of slave light pulses during each period of time that a master light pulse is received, such that the phase of a light pulse from a sequence has a random relationship to the phase of a light pulse from a subsequent sequence, and wherein each sequence comprises a first, second and third slave light pulse that are temporally separated from one another by a first time interval and wherein the phase differences between the first, second and third slave light pulses depend on the phase modulation features; and an interference apparatus, wherein the interference apparatus is optically coupled to the slave light source and is configured to receive sequences of slave light pulses, and wherein the interference apparatus comprises an interference component and a delay element, the delay element being configured to delay the received sequences of slave light pulses by the first time interval to form delayed sequences of slave light pulses, and wherein the interference apparatus is further configured to:

interfere the received sequences of slave light pulses with the delayed sequences of slave light pulses at the interference component, such that pulses from a received sequence interfere with adjacent pulses of the delayed sequence; and output interfered pulses, wherein the interfered pulses comprise a first and a second output pulse that have a first and second predetermined amplitude respectively and a predetermined relative phase between them.

The master light pulses are injected into the slave light source. The master light pulses seed slave light pulses, such one master light pulse is injected into the slave light source before slave light pulses are generated during a period of time that the master light pulse is injected. Slave light pulses that are generated during a period of time that a master pulse is injected have a fixed phase relationship to that master pulse. The phase of a master light pulse and the phase of a subsequent master light pulse have a random relationship.

The slave light pulses that are generated during a period of time that a master light pulse is injected have a fixed phase relationship to that master light pulse. Subsequently generated slave light pulses from another sequence of slave light pulses that are generated during another period of time that a subsequent master light pulse is injected have a fixed phase relationship to that subsequent master light pulse. The phase of each slave light pulses also have a random relationship with the phase of each of the pulses from another sequence of slave light pulses. In other words, the phase of each sequence slave light pulses is globally random. The global randomness may provide security against a state determination attack when the optical system is used in a QKD system.

The optical system generates amplitude and phase modulated pulses using phase-randomised laser seeding and an interferometer. The above system achieves phase and amplitude modulation by controlling the first control signal applied to the master light source. The first control signal is a driving signal. The above systems do not require active components beyond the master and slave light sources.

Therefore, the optical source according to the first aspect may have improved compactness and simplicity.

According to an embodiment, a first controller is configured to apply a time varying first control signal to the master light source.

According to an embodiment, a second controller is configured to apply a time varying second control signal to the slave light source.

According to an embodiment, a time varying second control signal is applied to the slave light source by the same controller as for the master light source.

According to one embodiment, the second control signal comprises a periodic signal; and the master light source is configured to intermittently generate master light pulses that are temporally separated by a second time interval, such that the generated sequences of three slave light pulses comprise a periodic sequence of slave light pulses wherein any adjacent slave light pulses are temporally separated by the first time interval.

According to one embodiment, the interference apparatus is further configured to interfere a pulse from a received sequence that is generated when one master light pulse is received with a pulse from a delayed sequence that is generated when a subsequent master light pulse is received; and the interfered pulses comprise a third output pulse that has a randomised amplitude. The third output pulse may be monitored e.g. for testing the quality of the phase randomisation in the phase-randomised light source.

According to one embodiment, the phase difference between the first output pulse and the second output pulse is determined from the two or more phase modulation features of the first control signal.

According to one embodiment, the first predetermined amplitude is determined from a first phase modulation feature of the first control signal.

According to one embodiment, the second predetermined amplitude is determined from a second phase modulation feature of the first control signal.

According to one embodiment, the interference apparatus is further configured to interfere the received slave light pulses with the delayed slave light pulses at the interference component and to output interfered pulses such that a third output pulse has a randomised amplitude. The third output pulse may be monitored e.g. for testing the quality of the phase randomisation in the phase-randomised light source.

According to one embodiment, the phase modulation features have voltage magnitudes of 1V or less. Since voltage magnitudes of 1V or less are used to control the phase the power consumption of the system may be reduced compared to systems that use higher voltages.

According to one embodiment, the master light source is a gain-switched laser.

According to one embodiment, the slave light source is a gain-switched laser.

According to one embodiment, the master light source and the slave light source are integrated laterally on a first substrate.

According to one embodiment, the interference apparatus is integrated laterally on the first substrate.

According to one embodiment, the interference component and the delay element are integrated laterally on a second substrate.

According to a second aspect, there is provided a quantum communication system, comprising a transmitter, wherein the transmitter comprises the optical system according to the first aspect.

According to one embodiment, the quantum communication system further comprises a receiver, and wherein the receiver is optically coupled to the transmitter and the receiver is configured to receive light pulses from said transmitter.

According to one embodiment, the receiver comprises a second interference apparatus, wherein the second interference apparatus comprises a second interference component and a second delay element, wherein the delay element is configured to delay the received light pulses by the first time interval to form delayed light pulses, and wherein the second interference apparatus is further configured to interfere the received light pulses with the delayed light pulses at the second interference component to form receiver output pulses.

According to one embodiment, the two or more phase modulation features are configured to encode information in a first encoding basis in the amplitude of the first output pulse and the amplitude of the second output pulse.

According to one embodiment, the two or more phase modulation features are configured to encode information in a second encoding basis in the relative phase between the first output pulse and the second output pulse.

According to one embodiment, the two or more phase modulation features are configured to attenuate the amplitude of the first or second output pulse to encode a decoy state pulse.

According to one embodiment, the receiver comprises a data processor, wherein the data processor is configured to measure detection statistics of the third output pulse, such that information about the quality of randomness of the pulses can be inferred.

According to a third aspect, there is provided a method for generating optical pulses, the method comprising:
  intermittently generating master light pulses using a master light source, wherein the phase of each generated master light pulse has a random relationship with the phase of each subsequently generated master light pulse;
  applying a first control signal to the master light source such that the master light source intermittently generates master light pulses, wherein the first control signal comprises a first and a second phase modulation features in the period of time that one master light pulse is generated, wherein each phase modulation feature comprises a perturbation in the control signal applied to the master light source;
  receiving master light pulses in a slave light source, wherein the slave light source is optically coupled to the master light source;
  applying a second control signal to the slave light source to cause the slave light source to generate a sequence of slave light pulses during each period of time that a master light pulse is received, such that the phase of a slave light pulse from a sequence has a random relationship to the phase of a light pulse from a subsequent sequence, and
  wherein each sequence comprises a first, second and third slave light pulse that are temporally separated from one another by a first time interval and wherein the phase differences between the first, second and third slave light pulses depend on the phase modulation features;
  receiving sequences of slave light pulses in an interference apparatus, wherein the interference apparatus is optically coupled to the slave light source and comprises an interference component and a delay element, wherein the delay element is configured to delay the received sequences by the first time interval to form delayed sequences of slave light pulses, and
  interfering the received sequences of slave light pulses with the delayed sequences of slave light pulses at the interference component, such that pulses from a received sequence interfere with adjacent pulses of the delayed sequence; and
  outputting interfered pulses, wherein the interfered pulses comprise a first and a second output pulse that have a first and second predetermined amplitude respectively and a predetermined relative phase between them.

According to a fourth aspect, there is provided a quantum communication method comprising the method according to the third aspect.

FIG. 1 is schematic illustration of an example of a source of pulses of light 100. The source 100 comprises: a continuous wave (CW) laser source 101 that continuously emits laser light; a first intensity modulator 103 that receives the continuous laser light from the CW laser 101; and a first electrical controller 105 that provides a time varying signal to the intensity modulator 103. The time varying is a signal that intermittently causes the intensity modulator 103 to block or unblock light received from the CW laser. The time varying signal may be a voltage signal.

The CW laser source 101 may be a semiconductor laser diode; the CW laser source may be driven by applying a constant DC current in order to switch the CW laser above a lasing threshold such that the CW source emits laser light continuously. Above the lasing threshold, the CW laser generates light while, below the lasing threshold, the CW laser emits almost no light.

The first intensity modulator 103 is configured to intermittently block and unblock light received from the CW laser and intermittently output light. The first intensity modulator 103 may therefore 'carve' out bursts of light from the continuous laser light emitted by the CW laser. The intensity modulator 103 may be based on the electro-optic effect, wherein the refractive index of a material is a function of applied electric field. Changes in refractive index result in changes in the optical function and results in changes in the amount light blocked or transmitted by the intensity modulator. The intensity modulator 103 may comprise a crystal, such as a lithium niobate (LiNbO3) crystal, in which the refractive index is a function of electric field strength, and an electric field may be applied by applying a voltage to electrodes positioned around the LiNbO3 crystal.

The first electrical controller 105 provides a time varying signal to the intensity modulator 103. The time varying signal may be a voltage signal that intermittently causes the intensity modulator 103 to block or unblock light received from the CW laser. When the intensity modulator 103 comprises lithium niobate, the voltage signal may be of the order of volts. For example, the voltage signal amplitude may be greater than 1V. In another example, the voltage signal amplitudes may be around 3V to 5V depending on the modulator geometry.

The time varying signal provided by the electrical controller 105 may be a periodic signal that periodically causes the intensity modulator to block and unblock light. For example, the periodic signal may be a voltage signal. A periodic signal is a signal that repeats itself at regular intervals. The regular interval is referred to as the period of the periodic signal. The source 100 outputs a train of pulses of light 107, where the separation between pulses is defined by the period of the periodic signal.

Figure 2:
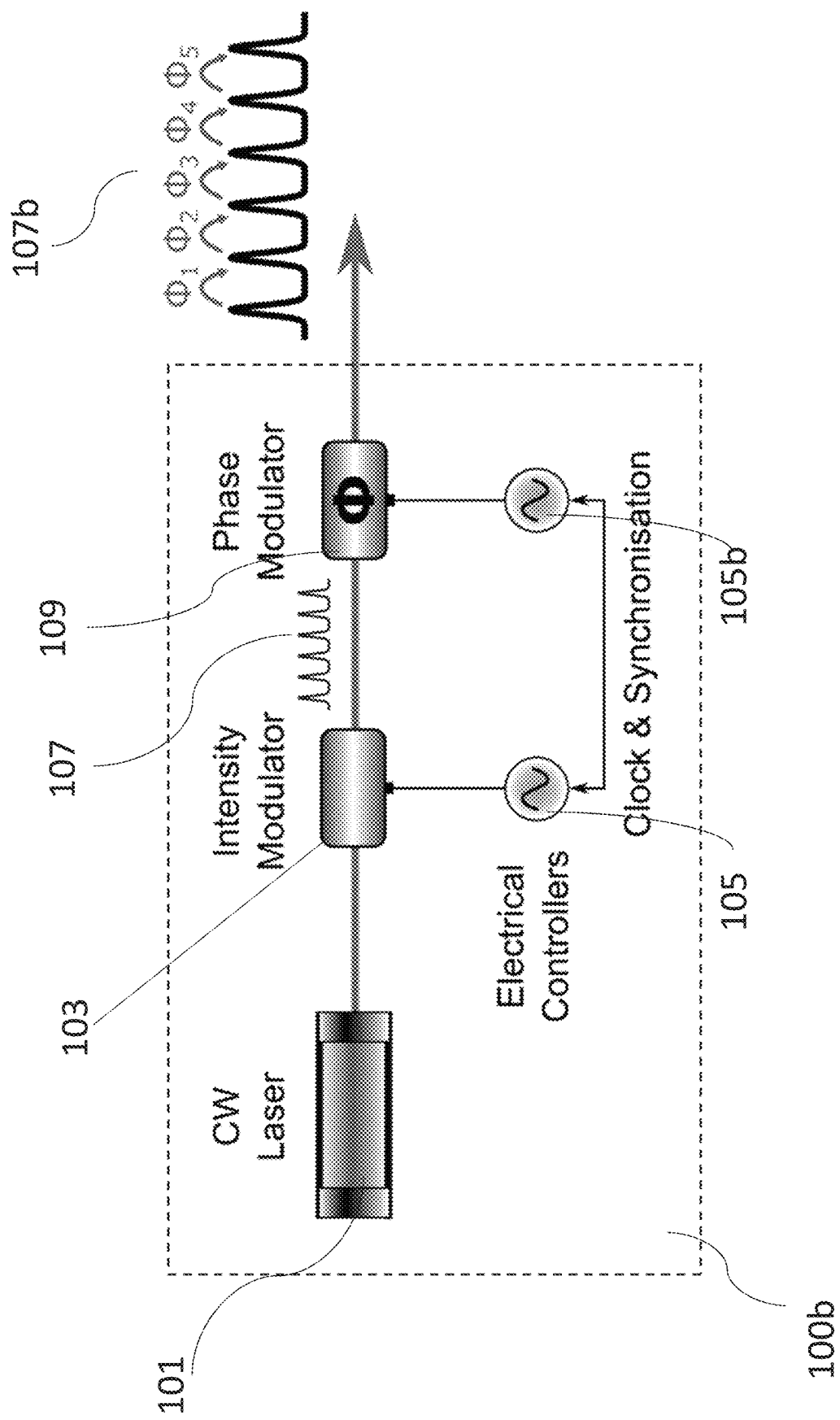
FIG. 2 is a schematic illustration of a source of phase modulated pulses of light in accordance with an example.

FIG. 2 is schematic illustration of an example of a source of pulses of light 100b that generates a train of phase modulated optical pulses 107b. The source 100b is similar to that of FIG. 1 but further comprises a phase modulator 109 and a second electrical controller 105b. The phase modulator 109 receives the train of pulses 107 generated by intensity modulator 103 and applies a phase shift to each pulse. The amount of phase shift added by the phase modulator 109 is controlled by the driving signal provided by a second electrical controller 105b. The optical source 100b may therefore output a train of pulses wherein the phase of each pulse is modulated.

The phase modulator 109 may be an electro-optic modulator, wherein the refractive index of the material is a function of applied electric field. Changes in refractive index result in changes in optical path length and results in changes in the phase shift applied by phase modulator. Different voltages are applied to the phase modulator so as to impart a different phase shift. The phase modulator such as described can comprise a crystal, such as a lithium niobate (LiNbO3) crystal, in which the refractive index is a function of electric field strength, and an electric field may be applied by applying a voltage to electrodes positioned around the LiNbO3 crystal. The relative phase shift applied to the phase modulator 109 is set by the second controller 105b which is configured to apply a voltage control signal to the phase modulator 109. When the phase modulator 109 comprises lithium niobate, the voltage signal may be of the order of volts. For example, the voltage signal may be greater than 1V. In another example, the voltage signal amplitudes may be around 3V to 5V depending on the modulator geometry.

To modulate the phase of each pulse, the first electrical controller 105 and the second electrical controller 105b of the source 100b are temporally synchronised, such that the phase shift is applied by the phase modulator 109 during a time when a pulse from the train of pulses 107 is received by the phase modulator 109. For example, the signal provided by the second electrical controller 105b may be delayed by a predetermined amount relative to the signal provided by the first electrical controller 105. The delay may be implemented by means of a delay line. The delay may be a length of cable for example.

The source 100b of FIG. 2 may be used in communication protocols where information is encoded in the phase between pulses. The source 100b may be used in a transmitter used to transmit pulses according to such communication protocols.

Figure 3:
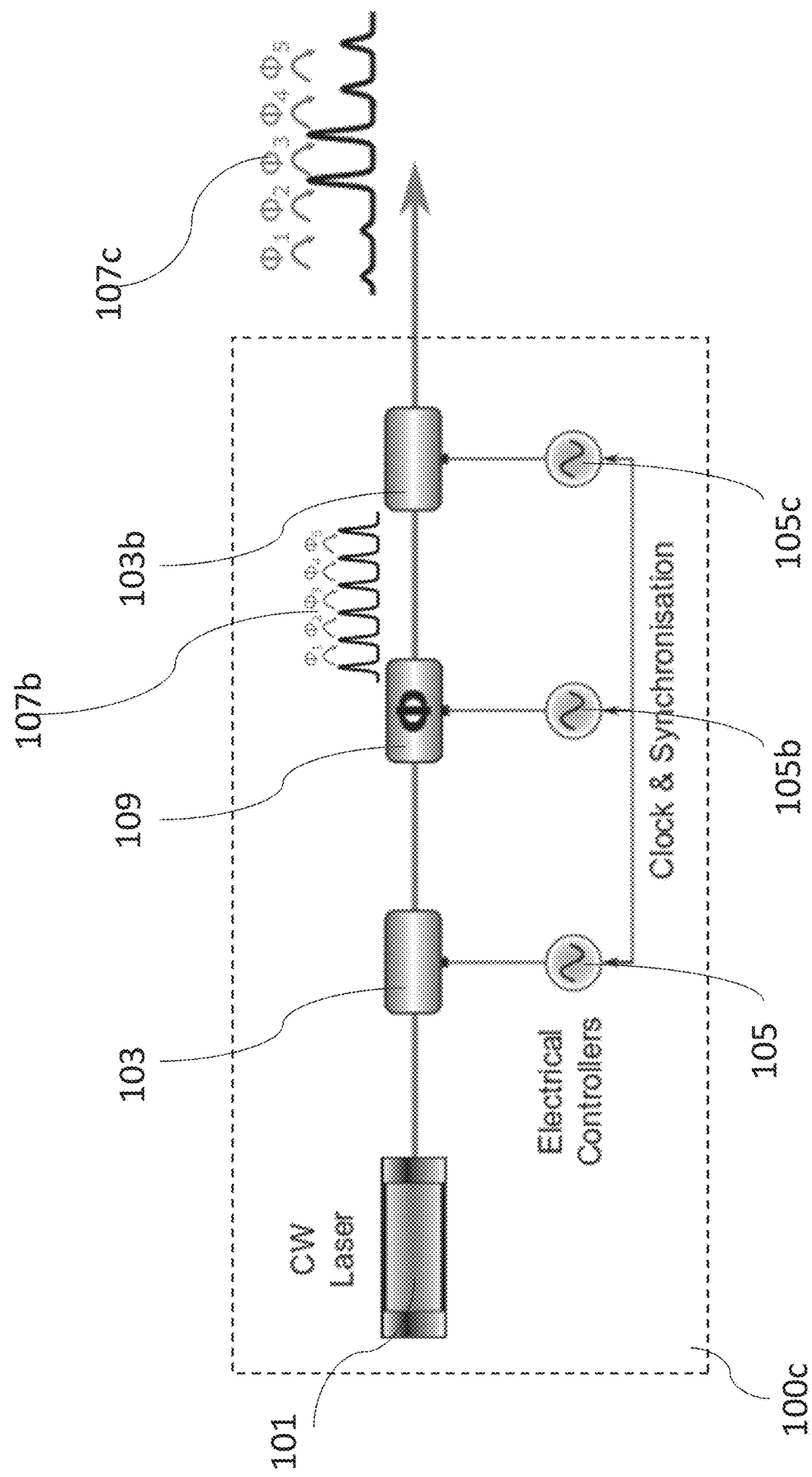
FIG. 3 is a schematic illustration of a source of phase and amplitude modulated pulses of light in accordance with an example.

FIG. 3 is schematic illustration of an example of a source of pulses of light 100c that generates a train of optical pulses 107c. The source 100c is similar to that of FIG. 2 but further comprises a second intensity modulator 103b and a third electrical controller 105c. The second intensity modulator 103b receives the train of pulses 107b generated by the phase modulator 109 and modulates the intensity of each pulse. Modulation of the intensity by the second intensity modulator 103b will be understood to mean that the inputted pulse is fully transmitted, fully blocked, or attenuated by some amount such that the intensity of the output pulse lies between the fully blocked or fully transmitted state. The transmission, blocking, or amount of attenuation caused by the intensity modulator 103b is controlled by the driving signal provided by a third electrical controller 105c. The amount of attenuation may be varied between pulses. The optical source 100c may therefore output a train of pulses wherein both the phase and intensity of each pulse is modulated.

The second intensity modulator 103b may be similar to the first intensity modulator 103 described in relation to FIG. 1. Additionally, other than fully transmitting or fully blocking an inputted pulse, the second intensity modulator 103b is also configured to attenuate the inputted pulse.

To modulate the intensity of each pulse, the third electrical controller 105c is temporally synchronised to the second electrical controller 105b and to the first electrical controller 105 such that the intensity modulation is applied by the intensity modulator 103b during a time when a pulse from the train of pulses 107b is received by the second intensity modulator 103b. The second electrical controller 105b is temporally synchronised in the same manner as the first electrical controller 105.

The source 100c of FIG. 3 may be used in communication protocols where both amplitude and phase modulation is used. For example, the source 100c may be used to provide additional intensity modulation in QKD to implement decoy states. The source 100c may be used in the transmitter of a QKD system for example. When the source 100c is used as a transmitter, three modulators (the intensity modulator 103, the phase modulator 109, the second intensity modulator 103b) are required. The modulators are also referred to as active elements. Each modulator requires an associated controller and the controllers require precise synchronisation and temporal alignment with each other.

FIG. 4(a) is a schematic illustration of gain-switched laser according to an example. A gain-switched laser may be used as an alternative to light source 100 described in relation to FIG. 1. A gain-switched laser generates light when the laser is switched above the lasing threshold and generates almost no light when the laser is switched below the lasing threshold. Laser 140 has a controller 141 which modulates the gain of the laser by modification of the pump power. The gain is modulated in a time varying manner, and may be modulated in a periodic manner. Driving the laser in this manner generates laser pulses at the laser output 142. The laser pulses may be of the order of picoseconds in duration.

If laser 140 is a semiconductor laser then it can be pumped electrically, by applying a current or voltage. In order to modulate the gain of a semiconductor laser, the controller 141 modulates the current or voltage applied to the laser.

If laser 140 is a fiber laser or solid-state laser, it can be pumped optically. In order to modulate the gain of a fiber laser or solid-state laser the controller 141 modulates the optical input applied to the laser.

FIG. 4(b) shows three graphs illustrating a gain modulation of a semiconductor gain-switched laser. The upper graph shows the current applied to the laser on the vertical axis, with time on the horizontal axis. The DC bias is indicated by a horizontal dotted line. The current applied to the laser has the form of a series of current modulation pulses. The wave in this case is a square-type waveform. A different gain modulation signal can be used, for example a sine wave, or a non-periodic time varying signal. In this case, the current is not reduced to zero in between the current modulation pulses, but only reduced to a bias value (which is indicated by the dotted line).

The current modulation signal is applied to the laser and switches the gain of the laser above and below the lasing threshold periodically. The second graph shows the carrier density of the laser on the vertical axis, against time on the horizontal axis. The lasing threshold is indicated by a dashed horizontal line. When a current modulation pulse is applied to the laser, the injected carriers increase the carrier density and the photon density increases.

The laser output generated by the modulation signal is shown in the lower graph. The vertical axis shows the laser intensity, with time on the horizontal axis. The laser outputs light when the carrier density is above the lasing threshold.

Photons generated by spontaneous emission inside the laser cavity are amplified sufficiently by stimulated emission to generate an output signal. The length of the delay between the application of the current modulation pulse and the generation of the output light depends on several parameters, such as the laser type, cavity length and pumping power.

The rapid increase of the photon density causes a decrease in the carrier density. This in turn decreases the photon density, which increases the carrier density. At this point the current modulation pulse is timed to switch back down to the DC bias level, and the laser emission dies off quickly. The laser output therefore consists of a train of short laser pulses as shown in the lower graph.

To generate longer pulses, the gain bias is chosen to be closer to the lasing threshold. This means that the carrier density crosses the lasing threshold earlier, which gives the light pulse more time to evolve. Initially the light intensity will overshoot and quickly reduce the carrier density. This in turn causes the photon density to decrease and the carrier density to increase, in turn increasing the light intensity. This competing process causes oscillations of the light intensity at the beginning of the pulse which are strongly damped, leading quickly to a steady-state where the intensity is constant. The oscillations are called relaxation oscillations. The laser pulse ends when the current pulse ends and switches the current to the bias value again.

FIG. 4(c) shows a schematic illustration of an electrical driving circuit for a semiconductor gain-switched laser. The semiconductor gain-switched laser is laser diode 145. The cathode of laser diode 145 is connected to bias-T 146 comprising inductor 147 and resistor or capacitor 148. These components make up a gain modulation unit for the semiconductor laser diode 145. Via inductor 147 a DC bias current is sent through the laser diode. This provides the gain bias (the minimum level of the current indicated by the dotted line in FIG. 3(b)). Via resistor or capacitor 148 an AC modulation current is sent through the laser diode, providing the gain modulation needed for gain-switching the laser above and below the lasing threshold.

Figure 5:
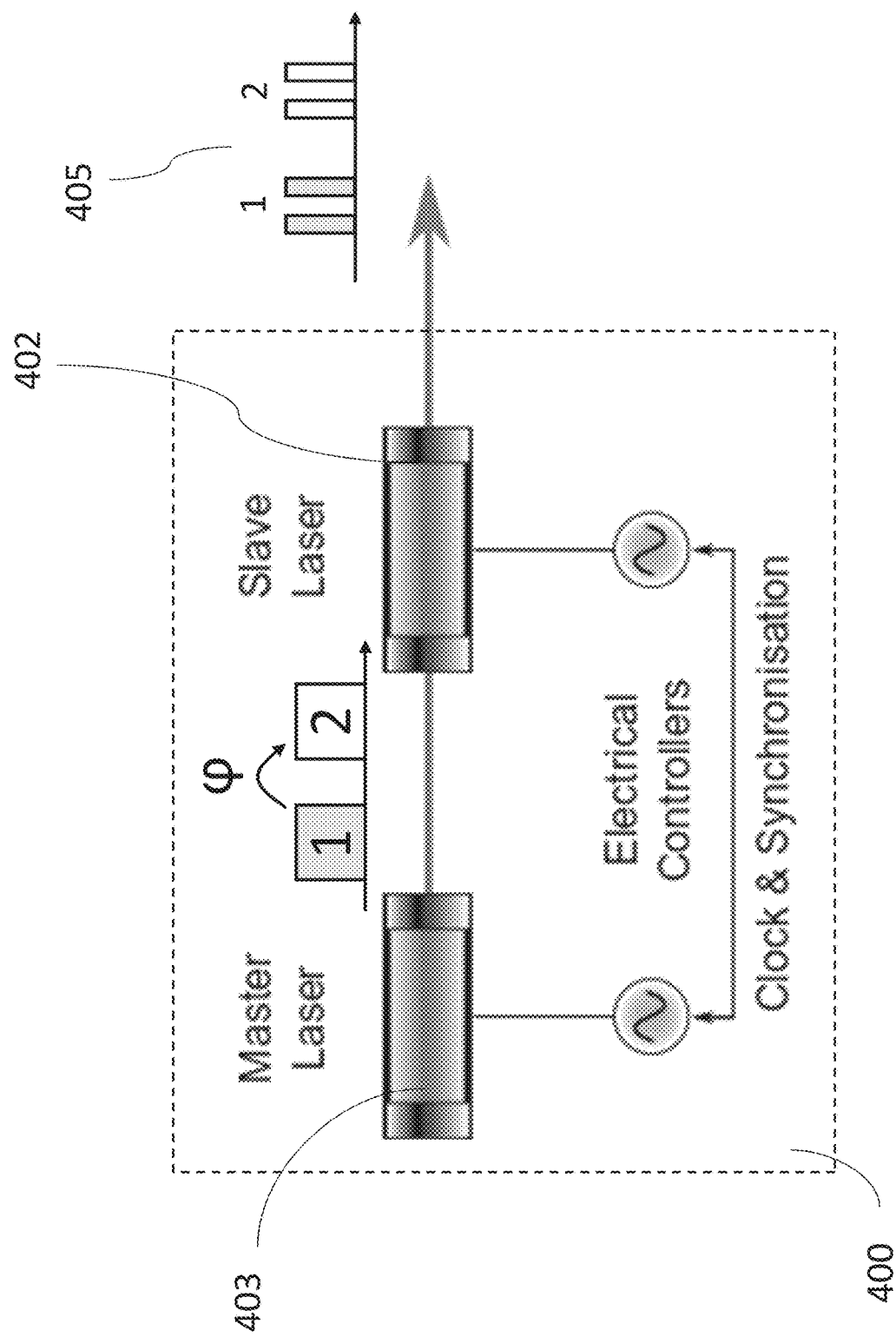
FIG. 5 is a schematic illustration of a source of pulses of light based on direct laser modulation and phase-randomised seeding.

FIG. 5 shows a schematic illustration of a source of pulses of light 400 configured to generate a train of phase modulated optical pulses. The light source 400 works on the mechanism of direct laser modulation and phase-randomised seeding.

The master light source 403 may be a gain-switched semiconductor laser as described in relation to FIG. 4. A controller applies an electrical signal to directly modulate the master light source 403 such that it intermittently generates pulses of light, for example as described above in relation to FIG. 4. The electrical signal may be referred to as a control signal.

The master light source 403 emits light pulses having a random phase relationship. This means that the phase of each light pulse emitted from the master light source has a random relationship to the phase of each subsequent light pulse. As shown in FIG. 5, the relative phase between the first pulse "1" and the second pulse "2" is φ, where φ is random. The master light pulses are injected into the slave light source 402. The slave light source 402 can also be a gain-switched semiconductor laser as described in relation to FIG. 4. A controller is configured to apply a signal to the slave light source so that one or more light pulse is generated during each period of time for which a master light pulse is injected. The controller that applies a signal to the slave laser may be the same controller as for the master light source 403 (not shown) or may be a different controller (as shown in FIG. 5). As shown in FIG. 5, two pulses are generated by the slave source during each period of time for which a master light pulse is injected. Each generated slave light pulse has a fixed phase relation to the injected master light pulse. As shown in FIG. 5, the generated slave light pulses "1" (shown shaded) that are generated when master light pulse 1 is injected have a fixed phase relation to master light pulse 1; generated slave light pulses "2" (shown blank) that are generated when master light pulse 2 is injected have a fixed phase relation to master light pulse 2. Slave light pulses "2" have a random phase relationship with slave light pulses "1".

Although the phase of the master light pulses is described as being random, in practice there might be a finite amount of correlations between the phases of two light pulses emitted in quick succession. By describing the phase difference as random, it is meant that these correlations are small and decay rapidly. In one embodiment, there are no measurable correlations for two light pulses that are emitted 400 ps apart. In one embodiment, there are no measurable correlations for two light pulses that are emitted ins apart. In one embodiment, there are no measurable correlations for two light pulses which are emitted 10 ns apart. In one embodiment, there are no measurable correlations for pulses emitted 100 ns apart.

Not all light sources produce pulses with a random phase relationship. A mode-locked pulsed laser for example cannot produce pulses having a random phase relationship.

Specific driving conditions for the master light source 403 can be used in order for a random phase relationship to occur between the generated master light pulses. For example, a semiconductor gain switched laser can produce pulses having a random phase relationship if the empty cavity condition is met. This is explained in more detail below.

The random nature of the phase of each light pulse generated arises because each light pulse is initiated through spontaneous emission. Spontaneous emission can be ascribed to the vacuum fluctuations of the optical field. In a gain-switched laser diode, spontaneous emission influences the electromagnetic phase of each generated pulse. When the laser cavity is empty, i.e. in the vacuum state, prior to lasing the lasing action is triggered entirely by spontaneous emission. Spontaneous emission inherits its electromagnetic phase from the vacuum, the phase of which is totally unbiased and random.

The empty cavity condition can be reached when cavity photons have a sufficient time to decay prior to each lasing event.

In one example, a laser diode may be gain-switched with a 2.5 GHz square wave, the average residual photon number of the cavity before the generation of each pulse is $10^{-10}$. This intensity is orders of magnitude weaker than the spontaneous emission. In one embodiment, when the master light source is driven at a repetition rate of less than or equal to 4.0 GHz, each master light source pulse will have a random electromagnetic phase.

The controller is thus configured to drive the master light source such that there is sufficient time for residual cavity photons to decay between each lasing event that the master light pulses are initiated through spontaneous emission instead of residual cavity photons. In one embodiment, the controller is configured to drive the master light source with a time varying current or voltage having a repetition rate of less than or equal to 4.0 GHz. In one embodiment, the controller is configured to drive the master light source with a time varying current or voltage with a repetition rate of less than or equal to 2.5 GHz. In one embodiment, the time gap between each generated master light pulse is greater than or equal to 125 ps. In one embodiment, the time gap between each generated master light pulse is greater than or equal to 200 ps.

The master light source 403 is connected to a first aperture of a slave light source 402 by a waveguide, for example an optical fibre. As second aperture of the slave light source 402 acts as the output of the source 400. A second waveguide, for example an optical fibre is connected to a second aperture of the slave light source 402. Alternatively, the light pulses may travel between the components of the phase randomised light source 400 through free space (meaning that no waveguides are required to connect the components such as the master light source 403 and the slave light source 402).

The slave light source 402 may also be a gain-switched semiconductor laser as described in relation to FIG. 4. Alternatively, the slave light source 402 can be any type of light source that generates pulses of coherent light. A controller drives the slave light source 402 such that it generates pulses of light, for example as described above in relation to FIG. 4. The controller applies a control signal that drives the slave light source 402 and the control signal may be synchronised with the control signal applied to the master light source 403. The controller may be configured to drive the slave light source with a time varying current or voltage signal with a repetition rate that is different from that of the signal applied to the master light source. For example, the controller may drive the slave light source with a time varying current or voltage with a repetition rate that is higher than that of the signal applied to the master light source. The controller that applies a control signal to the slave laser may be the same controller as the controller that applies a control signal to the master laser. Alternatively, the controllers may be different.

Master light source 403 generates a sequence of light pulses which are referred to as master light pulses. The phase of each master light pulse has a random relationship to the phase of each subsequently generated master light pulse. The master light pulses are then injected as "seeds" into the slave light source 402, leading to pulsed injection seeding.

In other words, the master light pulses are emitted from the master light source 403 into the waveguide, and enter slave light source 402 through the first aperture. Light from master light source 403 enters the optical cavity of the slave light source 402 and causes pulsed injection seeding of the slave light source 402. The term pulsed injection seeding can refer to laser seeding, or seeding by a light source other than a laser. Slave light pulses are generated through pulsed injection seeding and are emitted from a second aperture of the slave light source 402.

When pulsed injection seeding occurs, each time the slave light source 402 is switched above the lasing threshold, the generated slave light pulse has a fixed phase relation to the injected master light pulse.

In order for pulsed injection seeding to occur, the optical frequency of the injected master light pulses must match the optical frequency of the slave light source 402 to within a certain range. In one embodiment, the difference in the frequency of the light supplied by the master light source 403 and the frequency of the slave light source 402 is less than 30 GHz. In some embodiments, where the slave light source 402 is a distributed feedback (DFB) laser diode the frequency difference is less than 100 GHz.

For successful pulsed injection seeding the relative power of the master light pulses that enter the optical cavity of the slave light source 402 has to be within certain limits which depend on the type of light source that is used. In one embodiment, the optical power of the injected master light pulses is at least 1000 times lower than the optical output power of the slave light source 402. In one embodiment, the optical power of the injected master light pulses is at least 100 times lower than the optical output power of the slave light source 402. In one embodiment, the optical power of the injected master light pulses is at least 10 times lower than the optical output power of the slave light source 402.

The master light source 403 can comprise a fixed optical attenuator that reduces the intensity of the master light pulses emitted. Alternatively, the master light source 403 can comprise an adjustable optical attenuator that is adjusted only slowly. The intensity of the generated slave light pulses depends on the intensity of the master light pulses.

With the correct driving conditions, the slave light pulses depend only weakly on the intensity of the master light pulses. In some cases, with the correct driving conditions, slave light pulses are not generated at all if no master light pulses are injected. Alternatively, in some cases, slave light pulses could be outputted when no master light pulses are injected, but their phase would be uncontrolled.

In general, the dynamics of injection locking and gain switching are highly nonlinear which means that modulating the intensity of the master light pulse (by varying the electrical drive signal applied to the master light source, or by varying the signal of an intensity modulator after the master light source) may not be a practical way to modulate the slave light pulse intensity. Therefore, while, optionally and additionally, the master light source 403 can comprise an intensity modulator that varies the intensity of the generated master light pulses before they are supplied to the slave light source 402, in order to vary the intensity of the generated slave light pulses, such an arrangement may not be a practical way of varying the intensity of the generated slave light pulses. Varying the intensity of the slave light pulses by directly varying the electrical signal applied to the slave light source is also not a practical approach because varying the slave light intensity in this way would also likely change the slave light frequency slightly (since varying the electrical applied to the slave laser modifies all the laser dynamics). Slave light pulses generated in this manner could therefore not be used in QKD since the light pulses would have different optical frequencies at different intensities, and an attacker could use this to exploit the system.

Optionally and additionally, the phase-randomised light source 400 can comprise a second optical attenuator that reduces the intensity of the slave light pulses generated by the slave light source 402 or an intensity modulator that varies the intensity of the slave light pulses generated by the slave light source 402. This arrangement is described further below in relation to FIG. 8.

In one embodiment, slave light source 402 and master light source 403 are electrically driven, gain-switched semiconductor laser diodes. In one embodiment, the slave light source and master light source have the same bandwidth. In one embodiment, both light sources have a bandwidth of 10 GHz. In one embodiment, both light sources have a bandwidth of 2.5 GHz. Here, the bandwidth means the highest bit rate achievable with the gain-switched laser diode under direct modulation. A laser of a certain bandwidth can be operated at a lower clock rate.

FIG. 6(a) is a schematic illustration of a phase-randomised light source 700a that can be used in an optical system. In this light source, the optical connection is realised by an optical waveguide, for example an optical fibre, connecting the two light sources through an optical circulator, configured such that light entering port 1 exits through port 2, and light entering port 2 exits through port 3. The light pulses generated by the master light source 703 travel along the optical waveguide until it reaches the slave light source 702. The light is injected into the slave light source 702, thus realising the pulsed injection seeding. In this phase-randomised light source 700a, the master and slave light sources are connected using an optical circulator 712 configured such that light entering port 1 of the optical circulator exits through post 2, and light entering port 2 exits through port 3.

Master light source 703 is connected to port 1 of optical circulator 712 by an optical waveguide, for example an optical fibre. Alternatively, the light pulses may travel between the components through free space. Port 2 of the optical circulator 712 is connected to slave light source 702 by an optical waveguide. Optical circulator 712 is configured such that light entering port 1 of the optical circulator 712 exits through port 2, and light entering the optical circulator 712 through port 2 exits through port 3.

Master light source 703 generates master light pulses, which travel along the optical waveguide and enter port 1 of optical circulator 712. Light from the master light pulses mainly exits through port 2 of the circulator, although a small fraction of the light may be absorbed or exit through port 3. Light from the master light pulses exits port 2 of optical circulator 712 and travels along the optical waveguide which is connected to slave light source 702. The master light pulses are injected into slave light source 702. The slave light source 702 is seeded by the master light pulses and generates slave light pulses.

The slave light source 702 is switched above the lasing threshold during the time that the each master light pulse is incident on the slave light source 702. Slave light source 702 therefore emits a slave light pulse corresponding to each master light pulse, which is emitted into the optical waveguide connected to the slave light source 702, and travels along the waveguide in the opposite direction to the master light pulses. The slave light pulses enter port 2 of the optical circulator 712 and exit port 3 of the optical circulator 712 into an optical waveguide, for example an optical fibre.

Alternatively or optionally, the slave light source 702 is switched above the lasing threshold one or more times during the time that each master pulse is incident on the slave light source 702. For example, the slave light source 702 may be similar to the example of FIG. 5 and it is switched above the lasing threshold twice during the time that each master pulse is incident such that two pulses are generated by the slave source 702 during each period of time for which a master light pulse is injected.

FIG. 6(b) is a schematic illustration of a phase-randomised light source 700b that can be used in an optical system. FIG. 6(b) shows an alternative optical connection used for seeding the slave light source 702, which makes use of an optical isolator 713 followed by a beam splitter 706. In this phase-randomised light source 700b, the master and slave light sources are connected using an optical isolator 713 and a beam splitter 706, with optical isolator 713 configured to let light pass from port 1 to port 2 and prevent light from passing from port 2 to port 1.

Master light source 703 is connected to port 1 of optical isolator 713 by an optical waveguide, such as an optical fibre. Alternatively, the light pulses may travel between the components through free space. A port 2 of optical isolator 713 is connected to port A of beam splitter 706 by a second optical waveguide, such as an optical fibre. Optical isolator 713 is configured to allow light to pass which enters via the port 1, but to prevent light from passing which enters via the port 2. In an alternative embodiment that does not comprise an optical isolator, the output of the coherent light source is directly connected to port A of beam splitter 706 by a single optical waveguide such as an optical fibre. An optical waveguide such as an optical fibre connects port C of the beam splitter 706 to slave light source 702.

Master light source 703 emits a master light pulse which enters the beam splitter 706 through port A. A first fraction of the light entering beam splitter 706 through port A exits through port C of the beam splitter. A second fraction entering the beam splitter 706 through port A exits through port D of the beam splitter. The first fraction of light that exits port C travels along the optical waveguide and is injected into the slave light source 702 and pulsed injection seeding occurs as described previously. The slave light pulses generated by slave light source 702 are emitted back into the optical waveguide, and travel along the waveguide in an opposite direction to the master light pulses. The slave light pulses enter beam splitter 706 through port C. A first fraction of the slave light pulses exit the beam splitter 706 through port A and a second fraction exit through port B.

The first fraction of the slave light pulses exiting the beam splitter 706 through port A is stopped at optical isolator 713. Optical isolator 713 therefore prevents light emitted from slave light source 702 from entering master light source 703 and causing a disturbance in the master light source 703. The output at port D of beam splitter 706 can be used for monitoring purposes.

Alternatively or optionally, the slave light source 702 is switched above the lasing threshold one or more times during the time that each master pulse is incident on the slave light source 702. For example, the slave light source 702 may be similar to the example of FIG. 5 and it is switched above the lasing threshold twice during the time that each master pulse is incident such that two pulses are generated by the slave source 702 during each period of time for which a master light pulse is injected.

FIG. 7 (a) to (d) shows a shows a schematic illustration of an optical system that generates optical pulses with phase modulation according to an example.

FIG. 7 (a) shows a light source that corresponds to the light source 700a described in relation to FIG. 6 (a). The master laser 703 is biased to produce nanosecond scale, quasi-steady-state optical pulses with shallow intensity modulation, which also modifies the optical phase. The gain-switched slave laser 702 emits short optical pulses which inherit the optical phase prepared by the master laser 703. The duration of each master laser pulse can be varied to seed a pulse train of different lengths. The electrical driving signals that are applied to each of the slave laser 703 and the master 702 lasers are shown in the inset. The relative phase between slave pulses emitted when a single master pulse is injected depends on the phase evolution of the master pulse and can be set to an arbitrary value by directly modulating the driving current applied to the master laser 703. For example, a relative phase $\varphi 1$ between two slave pulses can be obtained by introducing a small perturbation in the driving signal of the master laser 703. The small perturbation appears as a shallow dip in the electrical driving signal of the master laser 703 when the electrical driving signal remains above the lasing threshold. Similarly, the relative phases between three slave pulses can be set to for example $\varphi 1$ and $\varphi 2$ by adding two small perturbations to the driving signal of the master laser 703. The small perturbations appear as shallow dips or peaks in the electrical driving signal of the master laser. When the perturbation to the driving signal is described as small, it is meant that the height of the peak or the depth of the peak is small. For example, when the driving signal corresponds to a voltage, a small perturbation refers to a peak or dip with a height of less than 1V. In another example, the perturbation has a height of 0.5V or less. In yet another example, the perturbation has a height of 0.1V or less.

Such perturbations in the driving signal may cause detrimental fluctuations in the intensity and optical frequency of the master pulses. To avoid these side effects, the gain of the slave laser may be switched off when the perturbations are applied to the master laser. The perturbations in the driving signal may also be referred to as phase modulation features.

FIG. 7 (b) illustrates the change in the optical frequency of the master laser which has been continuously emitting at a central frequency of $v_0$ when a small perturbation is applied to the electrical driving signal as shown in FIG. 7 (a). The small perturbation is applied for a duration $t_m$. The perturbation causes a change $\Delta v$ in the optical frequency of the master laser 703. The optical frequency returns to its initial value when the perturbation is removed.

FIG. 7 (c) shows a plot of the optical phase trajectories with and without the perturbation of the master laser. When a perturbation is applied, the phase trajectory is modified by an amount of $\Delta \phi = 2\pi \times \Delta v \times t_m$.

FIG. 7 (d) shows two slave pulses emitted by the slave laser during the time that a single master pulse has been injected. The perturbation described above has been applied to the master laser during the time interval between the emission of the two slave pulses. The first slave pulse has a fixed phase relationship to the phase of the master pulse, and the second pulse has the same fixed phase relationship to the modified phase of the master pulse. Thus, the phase difference $\Delta \phi$ is transferred to the relative phase between pulses emitted by the slave laser.

Figure 8:
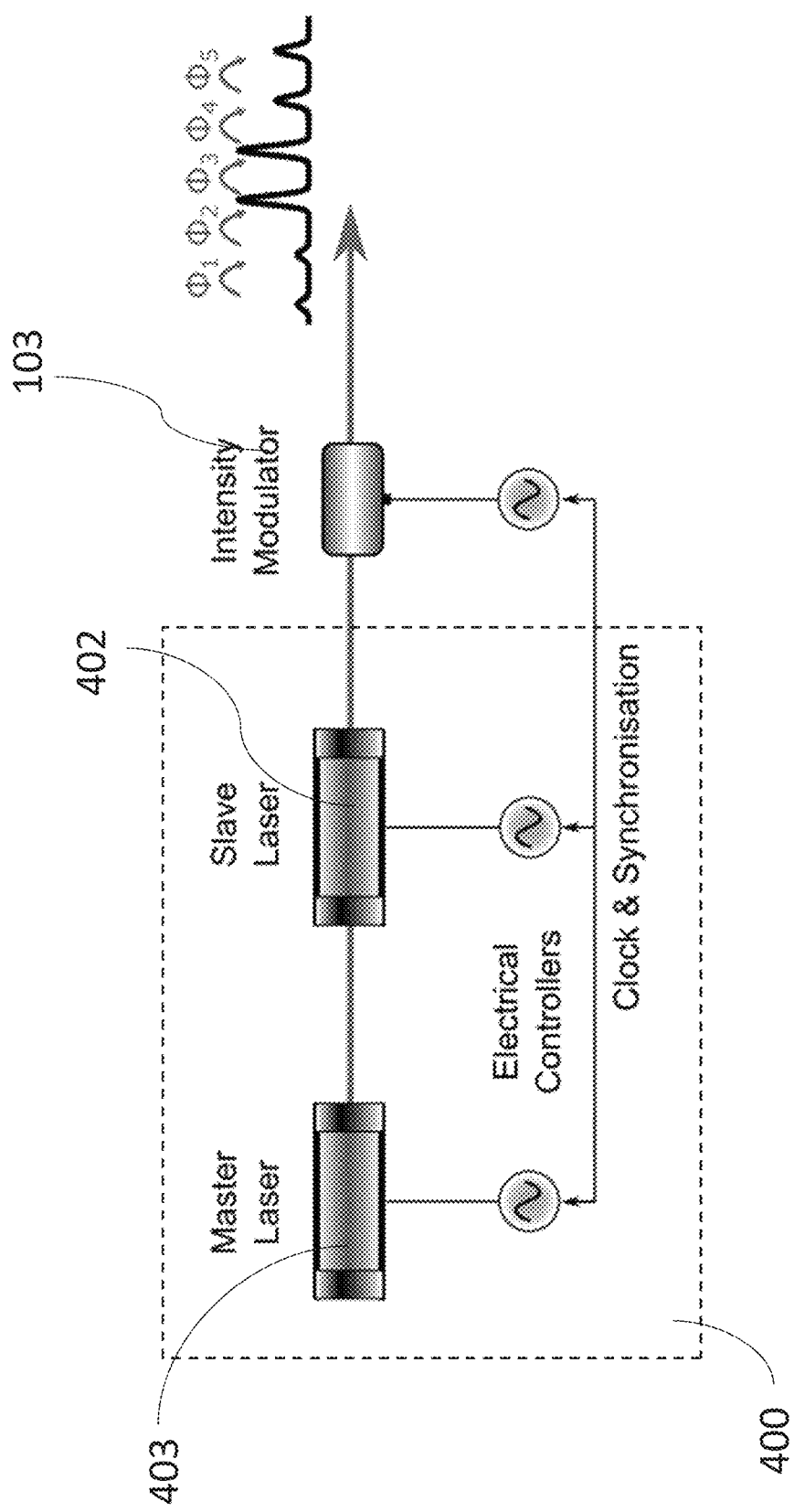
FIG. 8 is a schematic illustration of an optical system that generates phase and amplitude modulated optical pulses in accordance with an example.

FIG. 8 shows a schematic illustration of an optical system that generates optical pulses with both phase and amplitude modulation according to an example. The optical system comprises light source 400 described above in relation to FIG. 5. When the electrical driving signals described above in relation to FIG. 7 (a) are applied to the master and slave lasers, the light source 400 may output pulses with a defined relative phase between them. To further modulate the amplitude of the pulses generated by light source 400, the pulses are directed to an intensity modulator 103. The intensity modulator 103 is similar to that described above in relation to FIG. 1. The intensity modulator 103 may modulate the amplitude of the emitted pulses. The intensity modulator is controlled by a controller, and as described above in relation to FIG. 1, 2 or 3, and the controller that controls the intensity modulator 103 is temporally synchronised with the controllers of the master and slave lasers. When the controllers are carefully synchronised, pulses with both phase and amplitude modulation may be generated.

The optical system of FIG. 8 requires an additional intensity modulator and controller compared to the optical system according to an embodiment that will be described below in relation to FIG. 9. The light source 400 of FIG. 8, which is described in relation to FIG. 5, may operate at clock rates of 2.5 GHz for example. Thus, in order to synchronise the controller controlling the additional intensity modulator, the controller and the additional intensity modulator is required to operate at least at clock rates 2.5 GHz. Therefore, when the optical system of FIG. 8 is used in a QKD transmitter for decoy state generation, it may be difficult to generate pulses at a high rate due to the additional complexity of synchronising and controlling the additional intensity modulator.

Figure 9:
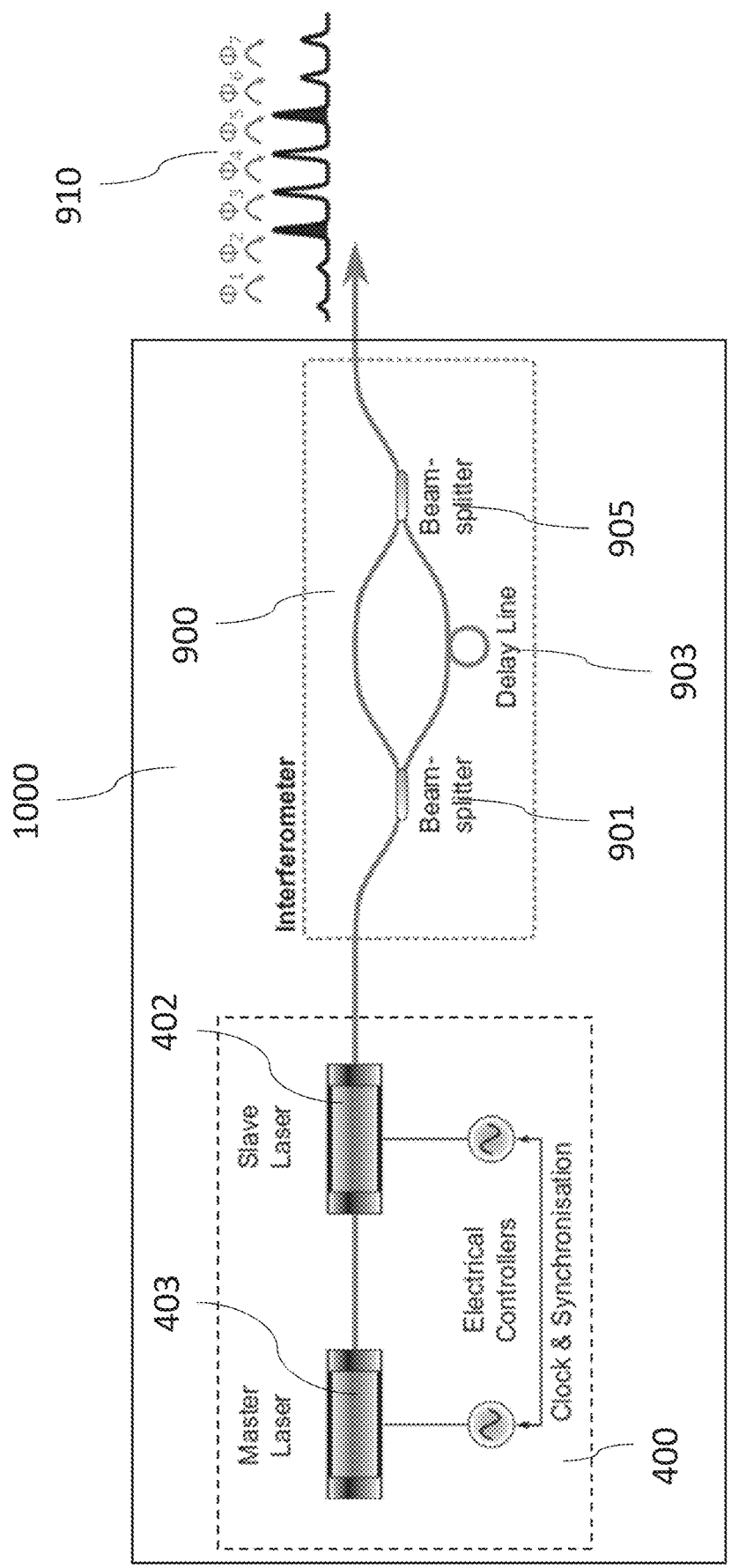
FIG. 9 is a schematic illustration of an optical source configured to generate phase and amplitude modulated optical pulses in accordance with an embodiment.

FIG. 9 is a schematic illustration of an optical source 1000 according to an embodiment, wherein the optical source 1000 comprises a light source, which is similar to light source 400 described above in relation to FIG. 5, and an interference device 900. The light source 400 is capable of generating a train of phase modulated optical pulses and light source 400 works on the mechanism of pulsed and phase-randomised seeding as described above in relation to FIG. 5. The light source 400 is optically coupled to the interference device 900 such that the train of phase modulated optical pulses is directed into the interference device 900. The interference device 900 causes the received pulse train to be interfered with a delayed version of the received pulse train. The interfered pulse train 910 provided by the interference device 900 is the output of the optical source 1000. The interference device 900 is part of the optical source 1000 that may be used to generate pulses.

As shown in FIG. 9, the interferometer is an unbalanced interferometer. As shown in FIG. 9, the unbalanced interferometer is an asymmetric Mach Zehnder interferometer (MZI). The train of phase modulated optical pulses is directed into the interferometer 900. The train of pulses are directed into a first beam splitter 901 configured to split the train of pulses into two fractions, namely, a first pulse train and a second pulse train. The first pulse train is directed into a first arm and the second pulse train is directed into a second arm of the interferometer. The second arm comprises a delay line 903 which delays the pulses of the second pulse train by a time D with respect to the pulses of the first pulse train. The delay element 903 is configured such that the delay D introduced corresponds to the temporal separation $t_{PULSE}$ between the pulses of the train of phase modulated optical pulses, such that each delayed pulse from the second pulse train temporally overlaps with a previous pulse from the first pulse train.

The first and second pulse trains are directed into a second beamsplitter 905, where they interfere to form a train of interfered pulses 910. Each pulse in the train of interfered pulses 910 is the result of interference between a pulse from the first pulse train, and a pulse from the second pulse train. In particular, each delayed pulse from the second pulse train interferes with a previous pulse from the first pulse train. The phase and intensity of the interfered pulse depends on the phase relationship between these two pulses from the first and second pulse train. The first and second pulse train themselves depend on the train of phase modulated optical pulses generated by light source 400. The phase modulation of the phase modulated optical pulses depends on the electrical driving signal applied to the master laser 403, as described above in relation to FIGS. 5, 6 and 7. By controlling the electrical driving signal applied to the master laser 403, the phase and intensity of the pulses in the interfered pulse train 910 can be controlled. How this is achieved will be described further below in relation to FIG. 10.

Returning to FIG. 9, although the optical source 1000 as shown comprises light source 400, it will be understood that, alternatively, light source 700a or 700b described above in relation to FIG. 6 could be used instead.

In the interferometer 900 show in FIG. 9, either the first beam splitter 901 or the second beam splitter 905, or both beam splitters could alternatively be replaced by 2×2 directional couplers.

Additionally and optionally, the interferometer 900 is phase stabilised such that the relative phase between the first pulse train and the second pulse train remains stable. In other words, the relative phase does not drift. For example, the interferometer 900 is held at a constant temperature to avoid phase drifts. A constant temperature may be maintained by using thermoelectric technology. Thermoelectric technology comprises the use of thermoelectric devices that either generate a voltage when there is a temperature difference across said device, or devices to transfer heat from a cold side to a hot side when a voltage is applied, thereby creating a temperature difference across said device. For example, the thermoelectric device may be a Peltier device. A Peltier device comprises a thermocouple (a junction of two different conductors), wherein, on application of an electric current, heat may be generated or removed from the junction. In order to use thermoelectric technology to phase stabilise the interferometer 900, a thermoelectric device may be thermally coupled to the interferometer 900 such that the thermoelectric device may pump heat into or remove heat from the interferometer. The thermoelectric device may be controlled by a controller that provides an electrical control signal. The controller may be configured to supply a control signal configured such that the temperature of the interferometer remains at or near a set value. In an example, the temperature of the interferometer is within at least 0.1° C. of the set value. In another example, the temperature of the interferometer is within at least 0.01° C. of the set value.

Additionally and optionally, for improved control of the pulses in the interfered pulse train 910, the electrical driving signal applied to the master light source 403 and/or the slave light source 402 is carefully chosen to ensure that the temporal separation $t_{PULSE}$ between the pulses of the train of phase modulated optical pulses corresponds to the time delay between pulses from the first pulse train and pulses from the second pulse train.

Alternatively, the MZI interferometer arrangement 900 of FIG. 9 may be replaced by a Michelson Interferometer (MI) for example. A MI is also an unbalanced interferometer; the MI comprises two arms, a reference arm and a long arm, both arms terminated by mirrors and the long arm comprising an interferometer delay, wherein light reflected from the two mirrors is interfered with each other and directed to the output of the interferometer.

The optical source 1000 of FIG. 9 may be implemented using bulk optics. With bulk optics, what is meant is that the components are discrete and separate components. The different components may be optically coupled to one another by means of a light guiding section such as an optical fibre. Alternatively, the different components may be optically coupled by means of a free-space optical link.

Alternatively, the optical source 1000 of FIG. 9 is integrated on a photonic chip. In the chip-based implementation, the master laser 403, the slave laser 402, and the interferometer 900 may be integrated laterally on a substrate in the plane parallel to the surface of the substrate. The different components are optically coupled to one another by means of light guiding sections. The light guiding sections may waveguide sections that are also integrated laterally on the substrate in the plane parallel to the surface of the substrate. In this embodiment, the lasers 403 and 402 are distributed feedback (DFB) lasers; however, it will be understood that other lasers such as distributed Bragg grating (DBR) or ridge lasers could also be used. When the optical system 1000 is integrated on a chip, the first beam splitter 901 and the second beam splitter 905, may be replaced by 2×2 directional couplers. Yet alternatively, the optical system 1000 of FIG. 9 is integrated on a photonic chip wherein the master laser 403 and the slave laser 402 are integrated laterally on a first substrate, the interferometer 900 is integrated laterally on a second substrate, and the output of the slave laser 402 is optically coupled to the input of the interferometer 900 by means of a light guiding section such as an optical fibre, or by means of free space coupling. The optical system 1000 described above is compatible integration on a photonic chip because an interferometer 900 is used in combination with light source 400 in order to implement phase and amplitude modulation. The interferometer 900 may be integrated on a photonic chip more easily than the intensity modulator described in FIG. 8 for example.

Figure 10:
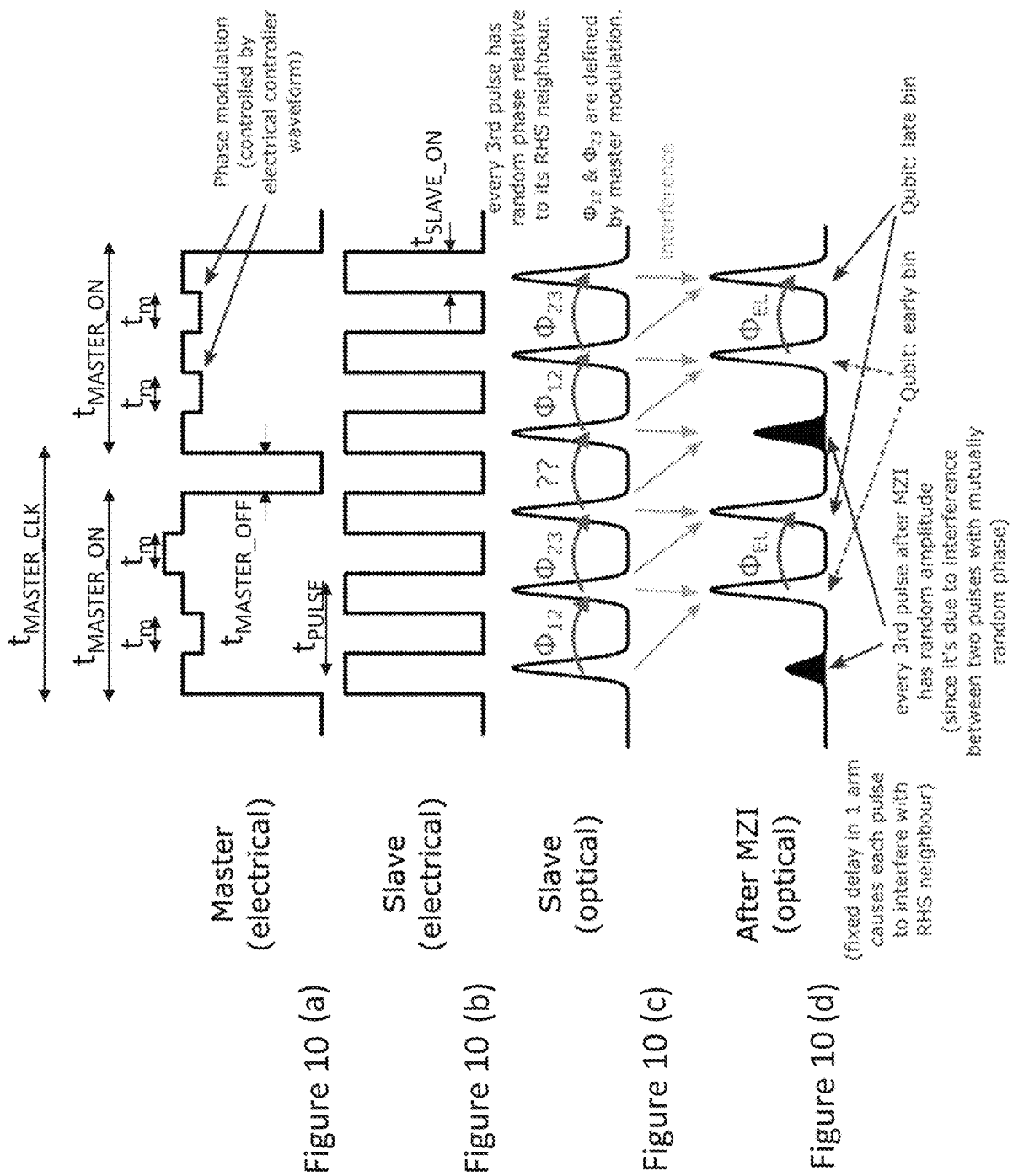
FIG. 10(*a*) shows the electrical signal applied to the master laser of FIG. 9.

FIG. 10 shows a schematic illustration of the electrical signals applied to the master light source 403 and the slave light source 402 of FIG. 9, the optical pulses generated by the light source 400, and the optical pulses 910 output by the optical system 1000 according to an embodiment.

FIG. 10 (a) shows the electrical signal applied to the Master laser 403 by the electrical controller. The electrical signal is also referred to as a control signal. The electrical signal applied to the Master laser 403 causes the Master laser 403 to emit pulses as explained above in relation to FIG. 4. The electrical signal waveform is similar to a periodically repeating square wave that repeats every master clock cycle (shown as $t_{MASTER\_CLK}$ in the figure). During each master clock cycle, the electrical signal has a high value for a time duration $t_{MASTER\_ON}$ and a low value for a time duration $t_{MASTER\_OFF}$. During each master clock cycle, the master laser 403 may emit a master light pulse during $t_{MASTER\_ON}$; therefore, the master laser 403 may periodically emit master light pulses with a period equal to $t_{MASTER\_CLK}$. Adjacent master light pulses are temporally separated by $t_{MASTER\_OFF}$. The time duration $t_{MASTER\_OFF}$ is chosen such that the optical pulses emitted by the master laser are phase randomised as described in relation to FIG. 5 for example. The phase of a master laser light pulse emitted during a master clock cycle therefore has a random relationship to the phase of another pulse emitted during another clock cycle. The electrical signal waveform differs from a periodically repeating square wave in that, during the duration $T_{MASTER\_ON}$ that the electrical signal has a high value, a phase modulation signal is overlaid on the square wave. The shape of the phase modulation signal may differ across different master clock cycles. The phase modulation signal corresponds to perturbations to the square wave and appears as peaks and/or dips as described in relation to FIG. 7. The perturbations to the square wave cause a modification of the phase trajectory of the master light pulses as described in relation to FIG. 7. Each perturbation has a temporal width labelled $t_m$. Whenever the electrical signal is high, the controller is configured to apply two perturbations (dips and/or peaks) to the square wave.

Additionally and optionally, the electrical controller that applies the electrical signal to the master laser 403 is an Arbitrary Waveform Generator (AWG). Alternatively, the electrical controller is a field-programmable gate array (FPGA).

Additionally and optionally, the temporal widths $t_m$ of all the peaks and/or dips have the same value.

FIG. 10 (b) shows the electrical signal applied to the Slave laser 402. The electrical signal may be applied by the same electrical controller as for the Master laser 403 (not shown) or by another electrical controller (as shown in FIG. 9). The electrical signal may be a periodic signal with period $t_{SLAVE\_CLK}$ (not shown). The electrical signal is also referred to as a control signal. The controller is configured so that whenever a master light pulse is injected, which is within the time window $t_{MASTER\_ON}$ that the electrical signal applied to the master laser is high, the electrical signal applied to the slave laser 402 causes the slave laser 402 to emit pulses as explained above in relation to FIG. 5. Further, as explained in relation to FIG. 7, the time $t_{SLAVE\_ON}$ for which the electrical signal applied to the slave laser 402 is high and for which the slave laser emits pulses does not overlap with the period during which a perturbation is applied to the electrical driving signal applied to the master laser 403. Furthermore, the other controller is configured to apply an electrical signal that causes the slave laser 402 to emit three slave light pulses in the time window that the master laser is emitting a pulse. The electrical signal applied to the slave laser may be a repeating square wave that repeats every slave clock cycle $t_{SLAVE\_CLK}$ (not shown), wherein the electrical signal has a high value for a time duration $t_{SLAVE\_ON}$ and a low value for a time duration $t_{SLAVE\_OFF}$. The duration of the slave clock cycle is given by $t_{SLAVE\_ON}+t_{SLAVE\_OFF}$.

Additionally and optionally, the repetition rate of the electrical control signal applied to the slave laser is three times that of the electrical control signal applied to the master laser.

Additionally and optionally, the time duration $t_{SLAVE\_ON}$ for which the electrical signal applied to the slave laser is high is less than or equal to a fifth of the time duration $T_{MASTER\_ON}$.

Additionally and optionally, $t_{SLAVE\_ON}$ is equal to $t_{SLAVE\_OFF}$.

FIG. 10 (c) shows the optical pulses emitted by light source 400 of FIG. 9 when the electrical signals of FIGS. 10 (a) and (b) are applied. The master pulses are injected into the slave light source, where they define the phase between the slave's output pulses. The two modulation features per clock cycle result in groups of 3 pulses with carefully defined phase difference. In particular, the two phase differences between the pulses, φ12 and φ23 can be precisely defined by means of the perturbation applied to the master electrical control signal (as described above in relation to FIG. 7 for example). However, the phase of each group of 3 slave pulses emitted when a master pulse is injected is random relative to another group of 3 slave pulses emitted when another master light pulse is injected. In other words, the phase of each group of 3 slave pulses is globally random. The global randomness may provide security in QKD against a state determination attack. The optical pulses emitted by light source 400 may be spaced in time by a constant amount $t_{PULSE}$. $t_{PULSE}$ is equal to the period of the control signal $t_{SLAVE\_CLK}$ described in relation to FIG. 10 (b). The time interval $t_{PULSE}$ is also referred to as the temporal separation between the slave light pulses. $t_{PULSE}$ is equal to the time delay D of the interferometer 900. For example, $t_{PULSE}$ is equal to 500 ps. In another example, $t_{PULSE}$ is equal to 500 ps for the case when the repetition rate of the electrical signal applied to the master laser is 0.67 GHz and the repetition rate of the electrical signal applied to the slave laser is 2 GHz.

FIG. 10 (d) shows the interfered optical pulses 910 output by the optical source 1000 of FIG. 9. The interfered optical pulse train 910 is obtained as described above in relation to FIG. 9. The interfered optical pulse train 910 comprises groups of three pulses where two of the three pulses have intensities and relative phases that are precisely determined by the phase shifts φ12 and φ23. The phase shifts φ12 and φ23 are obtained by applying phase modulation features to the electrical signal applied to the master laser as described above. The group of three pulses output by the optical system 1000 is also referred to as a pulse triplet. For every clock cycle of the master laser of the optical system 1000, a pulse triplet will be emitted at the output of the interferometer 900. The two pulses with defined phase and amplitude are referred to as an early pulse (which appears in an early time bin) and a late pulse (which appears in a late bin). The amplitude of early and late time pulses can be controlled independently by setting φ12 & φ23.

The amplitude of the early time bin pulse is given as:

$$(\cos(\phi_{12})+1)/2 \qquad \text{(Equation 1)}$$

The amplitude of the late time bin pulse is given as:

$$(\cos(\phi_{23})+1)/2 \qquad \text{(Equation 2)}$$

The phase between early and late time bins is given by:

$$\phi_{EL}=\arg(\exp(i\phi_{12})+\exp(i\phi_{12}+i\phi_{23}))-\arg(\exp(i\phi_{12})+1) \qquad \text{(Equation 3)}$$

The third pulse of every group of three pulses has a random amplitude because it results from the interference of pulses of the slave laser that were seeded by different master light pulses (that have a random phase relationship to one another). The third pulse with random amplitude cannot be used for information encoding, but it could be monitored e.g. for testing the quality of phase randomisation in the transmitter and thus ensuring the security of the QKD system. The two pulses with deterministically controlled amplitude and phase can be used to encode information in a QKD system (for example, they can be used as the early and late pulse as described further below). How the sequence of three pulses can be used in a QKD system will be described further below.

The above arrangement enables pulse intensities to be continuously varied, without the need for an intensity modulator or any additional electronic controllers beyond the controller(s) used for gain-switched optical injection locked light source 400. Arbitrary control of the output pulse intensity and phase is obtained by adjusting only the electrical waveform applied to the master light source. Compared to the example shown in FIG. 8, this eliminates the need for a separate intensity modulator and its controller. The resulting setup is more compact, lower cost and simpler.

Additionally, by varying the pulse intensity and phase using the system of FIG. 9 and the driving signals of FIG. 10, the magnitude of the electronic control signals required to achieve such modulation can be lower than the magnitude of an electronic control signal applied to an intensity modulator device such as that described in relation to FIG. 8. For example, the magnitude of the electronic control signal is less than or equal to 1V. In the above, the magnitude of the electronic control signal refers to the height or depth of the perturbation applied to the electrical signal controlling the master laser.

Additionally and optionally, the magnitude of the electronic control signal required to achieve pulse intensity and phase modulation may be less than 0.5 volts. Additionally and optionally, the magnitude is 0.1 volts or less.

Figures 11A, 11B, 11C:
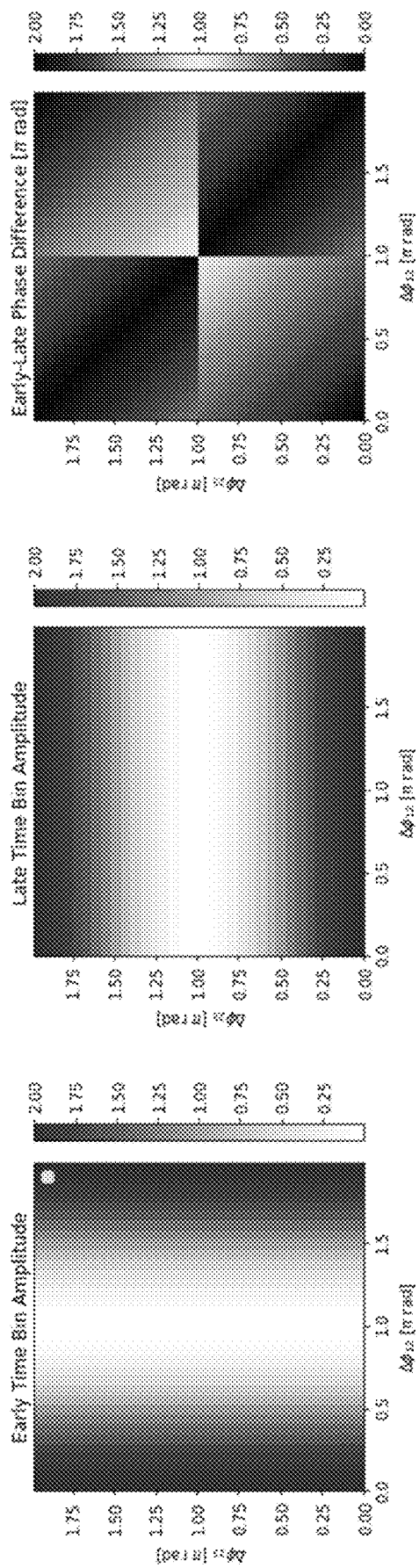
FIG. 11 (*a*) shows a heatmap illustrating the amplitude of an early pulse emitted by the optical system of FIG. 9.

FIGS. 11 (a) and (b) shows heatmaps illustrating how the amplitude of the early and late time bin pulses vary as a function of the phase modulation φ12 and φ23. The amplitude of the early time bin pulse shown in the heatmap is computed according to Equations 1 and 2 above.

FIG. 11 (c) shows a heatmap illustrating how the phase difference between the early and late time bin pulses vary as a function of the phase modulation φ12 and φ23. The phase difference between early and late time bins shown in the heatmap is computed according to equation 3 above.

Figure 12:
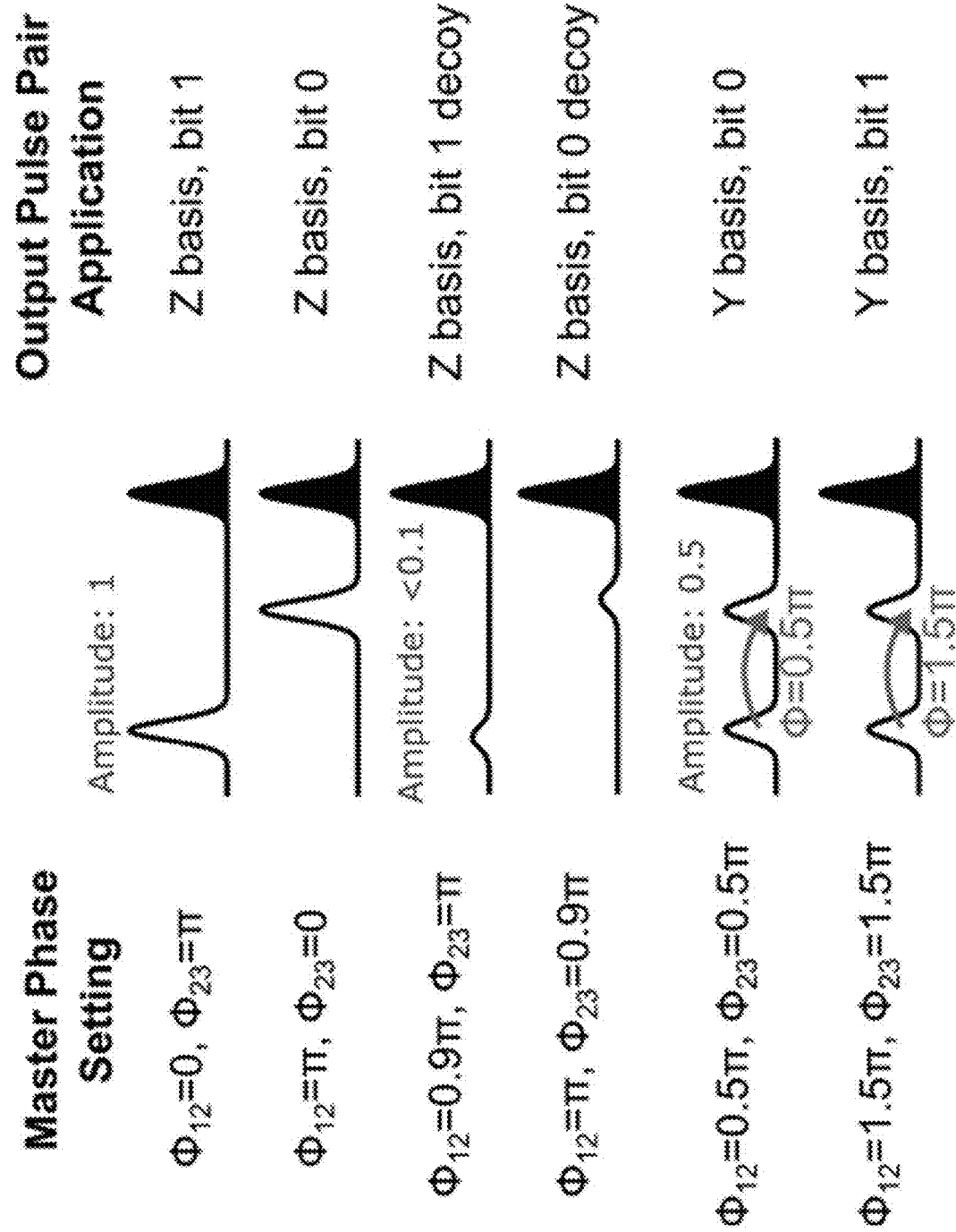
FIG. 12 is a schematic illustration of the pulse pair encodings used in QKD according to an embodiment.

FIG. 12 is a schematic illustration showing how the pulse triplets generated by the optical system 1000 of FIG. 9 using the driving signals of FIG. 10 can be used in a transmitter for QKD. In particular, optical system 1000 of FIG. 9 is suitable for decoy-state quantum key distribution (QKD), MDI QKD, and TF QKD. Decoy-state QKD is a practical QKD scheme where information is transmitted by Alice using the phase or energy/time of optical pulses of signal states. Decoy-state QKD overcomes a limitation that, in practice, QKD transmitters use attenuated pulsed lasers which are coherent states rather than true single photons. Therefore, as there is a non-negligible probability of the transmitter emitting multiple photons for some bits, the QKD system is vulnerable to an attack known as the photon number splitting attack. This attack is prevented by sending decoy states as well as signal states. To transmit decoy states, Alice transmits qubits using variable intensity levels (for decoy states) such that the photon number statistics vary. At the end of the transmission, Alice publicly announces which intensity level has been used for the transmission of each qubit. By checking the loss or statistics of the received qubits at the legitimate recipient's end (Bob), Alice and Bob will be able to detect if an attack has occurred.

For QKD protocols such as the BB84 protocol, pairs of pulses (where the first pulse is called the early pulse, and the second pulse is called the late pulse) are required. Information is encoded either in the phase between the pulses, or in their intensity (such that a bit 0 corresponds to sending only the late pules of the pair and a bit 1 corresponds to sending only the early pulse). In addition, the intensity of each pulse needs to be varied over multiple levels to implement decoy states.

FIG. 12 shows how the phase modulation settings of the master laser of the optical system 1000 enable the optical system 1000 to be used as a transmitter for QKD. In particular, FIG. 12 shows how the required phase values $\phi 12$ & $\phi 23$ (which are obtained by carefully setting the perturbation to the electrical control signal applied to the master laser 403) are adjusted to achieve common basis encoding, in addition to encoding a decoy state with lower pulse intensity.

The left column of FIG. 12 shows the combination of values for $\phi 12$ & $\phi 23$. The middle column shows the pulse triplets output by the optical system 1000. The pulse triplets comprise a pulse pair (comprising an early pulse and a late pulse) with defined amplitude and phase and a third pulse with a random intensity and phase (shown shaded in FIG. 12). For optical communications, it is expected that the pulse pair (comprising an early pulse and a late pulse) would be used to encode the information. The third pulse is not used for encoding information; the third pulse may be used, for example, to measure the quality of randomness as this is a metric that can be used to indicate good quality of pulse preparation for various quantum communication protocols). The right column shows how the output pulse pair may be used as different encodings corresponding to different bit values/bases; the Z basis corresponds to information being encoded in the amplitude of the early or late pulse; while the Y basis refers to a pair of pulses where information is encoded in the relative phase. For example, when $\phi 12=0$ & $\phi 23=\pi$ (first row), the amplitude of the early pulse is 1 and the amplitude of the late pulse is 0, based on the equations described in relation to FIG. 11. Similarly, when $\phi 12=\pi$ & $\phi 23=0$ (second row), the amplitude of the early pulse is 0 and the amplitude of the late pulse is 1. In the first two rows, the information is encoded in the amplitude of the early and late pulses (Z basis).

When $\phi 12=0.9\pi$ & $\phi 23=\pi$ (third row), the amplitude of the early pulse is <0.1 and the amplitude of the late pulse is 0; conversely, when $\phi 12=\pi$ & $\phi 23=0.9\pi$ (fourth row), the amplitude of the early pulse is 0 and the amplitude of the late pulse is <0.1. In the last two rows, $\phi 12$ & $\phi 23$ are such that both early and late pulses have an amplitude of 0.5; the information is encoded in the relative phase $\phi_{EL}$ between the pulses in this case (Y basis). In addition to the early and late pulses, a third pulse (shown shaded in the Figure) is also output for each combination of $\phi 12$ & $\phi 23$.

The example pulses shown in FIG. 12 could be used to implement a decoy-state QKD protocol. Rows 1, 2, 5 and 6 show the preparation of signal states for bits 0 and 1 in two non-orthogonal bases (Z and Y) and rows 3 & 4 show the preparation of corresponding decoy states, where the pulse intensity is significantly reduced compared to the signal state. The decoy states correspond to those states where intensity of the early pulse (third row) and the intensity of the late pulse (fourth row) are lower. As described earlier, if an attacker attempts to perform a photon number splitting attack, which involves blocking all bits that are not multiphoton states, then the detection statistics for the signal and decoy states will be different due to their different initial intensities. Alice & Bob can thus detect this attack by intermittently communicating when they sent decoy states and therefore, an attacker is unable to compromise the security.

Figure 13:
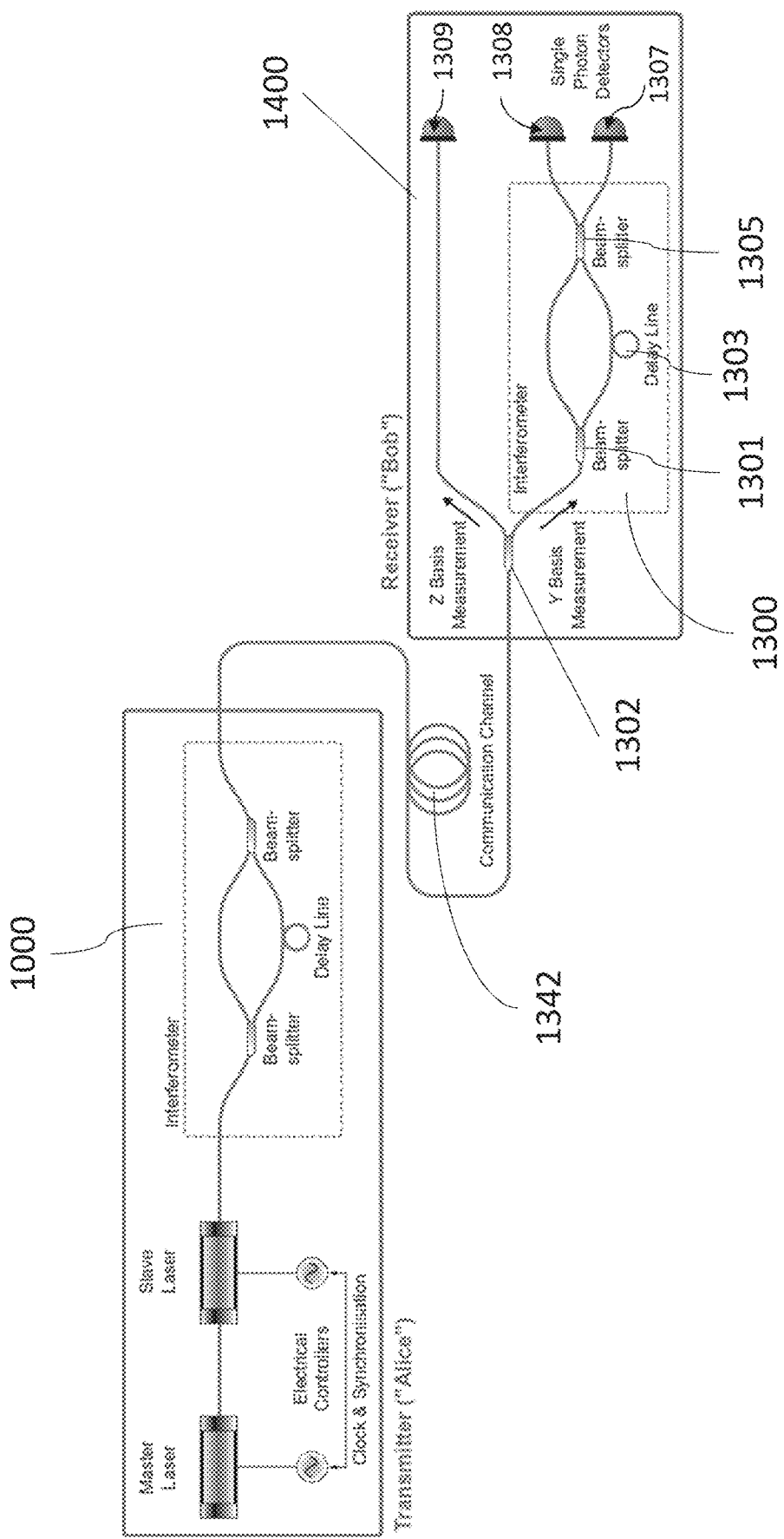
FIG. 13 is a schematic illustration of a QKD system in accordance with an embodiment.

FIG. 13 shows a schematic illustration of a QKD system in accordance with an embodiment. The QKD system uses the optical system 1000 described in relation to FIG. 9 as a transmitter.

The transmitter 1000 is configured to generate a train of pulses as described in relation to FIGS. 9, 10 and 11. The generated train of pulses comprises pulse triplets which may be used for QKD as described in relation to FIG. 12. The train of pulses generated by the transmitter 1000 is directed to a receiver 1400 via communication channel 1342. The communication channel 1342 may be an optical fibre based channel for example.

At the receiver apparatus (referred to as "Bob"), each bit is decoded by measuring each received pulse triplet in either the Z basis or Y basis. The received train of pulses is directed to a splitter component 1302, which randomly directs each pulse triplet to be measured in the Z basis or Y basis. The splitter component 1302 splits the received train of pulses into two fractions; namely a third train of pulses which is directed to a first single photon detector 1309 (for Z basis measurements), and a fourth train of pulses of pulses which is directed to an interferometer 1300 (for Y basis measurements). In an example, the splitter component 1302 is a passive fibre coupler.

For Z basis measurements, the third train of pulses are directly incident on the first single photon detector 1309, which records photon arrival times. The output of the detector 1309 is processed by a data processor (not shown) which decodes the information based on pulse measurements—in this case, the data processor would assign a bit 1 if a photon arrived in the early time bin window (that is, the early pulse has an amplitude of 1 as shown in row 1 of FIG. 12), and a bit 0 if a photon arrived in the late time bin window (that is, the late pulse has an amplitude of 1 as shown in row 2 of FIG. 12).

For Y basis measurements, the fourth train of pulses are directed into an interferometer 1300 where it is directed into a third beam splitter 1301. The beam splitter 1301 further splits the fourth train of pulses into two fractions, namely, a fifth train of pulses which is directed into a third arm (upper) and into a sixth train of pulses which is directed into a fourth arm (lower). The fourth arm comprises a delay element 1303 which delays the pulses of the sixth train of pulses by a time D with respect to the pulses of the fifth train of pulses. The delay element 1303 is configured such that the delay D introduced corresponds to the temporal separation between the pulses of the train of received pulses, such that each delayed pulse from the sixth pulse train temporally overlaps with a previous pulse from the fifth pulse train. Note that the delay D introduced by the delay line 1303 matches the delay D introduced by the delay element 903 used in the transmitter 1000.

The fifth train of pulses and the sixth train of pulses are then interfered at an interfering beam splitter 1305 to and the resulting interfered pulses are detected by a second and/or third single photon detectors 1307 and 1308. The resulting interfered pulses resulting from interference at the interfering beam splitter 1305 are referred to as receiver output pulses. The measurement at the second and/or third single-photon detectors depends on the phase difference between the pulses from the third train and the fourth train of pulses. The output of the single photon detectors is processed by a data processor (not shown) which decodes the information transmitted based on the pulse measurements.

When a pulse triplet is encoded in the Y basis (i.e. with a phase difference defined between early and late pulse) is interfered with a delayed version of itself in interferometer 1300, the receiver output pulses would correspond to a group of three output pulses (not shown). The first receiver output pulse corresponds to interference between the first and second pulse of the triplet (i.e. the "early" and "late" pulse) and thus, by measuring which photon detector clicks for this time window, the bit can be decoded (i.e. whether bit 0 or bit 1 is received). The second and third receiver output pulses involve interference with the third pulse of the triplet (the pulse with random amplitude) and, therefore, the second and third receiver output pulses will also be randomised. The second and third receiver output pulses are therefore not used for bit decoding and the bit value is decoded by configuring the data processor to consider only detector clicks in the time window that corresponds to the first receiver output pulse for each bit.

When the transmitter 1000 is used to implement decoy-state QKD, as described above in relation to FIGS. 10 to 12, the transmitter 1000 is configured to generate groups of three pulses, wherein two of the pulses have carefully defined amplitudes and relative phases and the third pulse has a random defined amplitude. The phase relationship between different groups of three pulses is random since they are seeded by different master light pulses (which have a random phase relationship between them). The global phase randomisation allows the security of decoy-state QKD to be similar to QKD with a single-photon source. For non-decoy state QKD, phase randomisation is not essential, but it increases the security level, the working distance and the final secure key rate. The phase randomisation means that the phase relationship between subsequently emitted groups of three light pulses is random. This means that an unauthorised eavesdropper, Eve, cannot lock her measuring apparatus to this phase and thus perform a better measurement of Alice's pulses.

From each group of three pulses received by the receiver Bob 1400, the receiver receives one of the pulse triplets shown in FIG. 12. In the receiver, the received pulses are passed through the interferometer 1300 where a received pulse triplet is made to interfere with a delayed version of the pulse triplet. The delay corresponds to the separation between two pulses.

Additionally and optionally, the data processor is configured to measure detection statistics of just the third pulse from the pulse triplets to, for example, infer information about the quality of randomness of the pulses, and therefore check the security of the quantum communication protocol that is implemented by the transmitter 1000.

Based on the above detector measurements, and once Alice and Bob compare which basis (Z or Y) they have used. The users discard all the data for which they accidentally chose different bases, and retain only those instances for which they chose identical bases.

The embodiments described above in relation to FIGS. 10, 11, 12 and 13 relate to the case where the slave laser 402 emits three slave light pulses in the time window that the master laser 403 is emitting a master light pulse. However, it will be understood that, alternatively, the controllers that apply electrical signals to the slave and master lasers can be configured so that N slave light pulses are emitted in the time window that a master light pulse is emitted. N is a natural number equal to three or more. In the case where N slave light pulses are emitted for every master light pulse, the repetition rate of the electrical control signal applied to the slave laser is N times that of the signal applied to the master laser. Additionally and optionally, the electrical control signal applied to the master laser 403 may comprise N-1 phase modulation features.

In the example where N=3, which is described above in relation to FIGS. 10, 11, 12 and 13, the optical system 1000 generates a train of pulses comprising groups of three pulses (each group of three pulses is also referred to as a pulse triplet). For a QKD transmitter using this scheme where N=3, the group of three pulses comprises 1 early time bin, 1 late time bin, and 1 random amplitude time bin.

In an example where N=5, the optical system 1000 generates a train of pulses comprising groups of five pulses. The group of five pulses could then comprise a very-early time bin, an early time bin, a late time bin, a very-late time bin, and one random amplitude time bin.

Examples with N>3 could be used to perform high-dimensional QKD, which is also referred to as large alphabet QKD. Compared to binary encoded QKD (which may be used with N=3 and which is described above in relation to FIGS. 10, 11, 12, and 13), large alphabet QKD may encode more secure information per detected photon.

The generation of optical pulses at high speeds with different intensities and phases is a key building block for optical communications. The range of modulation (i.e. range of intensity and phase values that can be achieved and the resolution with which the values can be precisely defined) directly affects how much information can be encoded onto light for transmission. For practical communication system applications, optical transmitters should be simple, compact, low cost, low power consumption and able to generate a wide range of pulse intensities and phase values to high precision.

The above described optical system and QKD transmitter, and QKD communication system can be used in quantum and classical optical communication systems. The above described systems are able to generate amplitude and phase modulated pulse triplets using phased-randomised laser seeding and an interferometer. The above described systems achieve phase and pulse modulation by controlling the electrical driving signal applied to the master light source. The above systems do not require further active elements beyond the lasers and therefore the above systems are simple, compact and low cost (since they require fewer components).

Furthermore, by varying the pulse intensity and phase using the above described concepts, the magnitude of the electronic control signals to achieve such modulation can be much lower (even <0.5 V) than an equivalent modulator devices used in the art. Therefore, the above-described systems can consume less power.

While certain arrangements have been described, these arrangements have been presented by way of example only, and are not intended to limit the scope of the inventions. Indeed, the apparatus and methods described herein may be embodied in a variety of other forms; furthermore various omissions, substitutions and changes in the form of the apparatuses described herein may be made.

The invention claimed is:

1. An optical source comprising:
a phase randomised light source, the phase randomised light source further comprising:
a master light source configured to intermittently generate master light pulses, wherein a phase of each generated master light pulse has a random relationship with a phase of each subsequently generated master light pulse, and wherein a first control signal is applicable to the master light source such that the master light source intermittently generates master light pulses; wherein the first control signal comprises a first and a second modulation feature in a period of time that one master light pulse is generated, wherein each phase modulation feature comprises a perturbation in the first control signal applied to the master light source;
a slave light source, wherein the slave light source is optically coupled to the master light source and is configured to receive the master light pulses, and wherein a second control signal is applicable to the slave light source to cause the slave light source to generate a sequence of slave light pulses during each period of time that a master light pulse is received, such that the phase of a light pulse from the sequence has a random relationship to the phase of a light pulse from a subsequent sequence, and
wherein each sequence comprises a first, second and third slave light pulse that are temporally separated from one another by a first time interval and wherein phase differences between the first, second and third slave light pulses depend on the phase modulation features; and
an interferometer, wherein the interferometer is optically coupled to the slave light source and is configured to receive the sequences of slave light pulses, and wherein the interferometer comprises an interference component and a delay element, the delay element being configured to delay the received sequences of slave light pulses by the first time interval to form delayed sequences of slave light pulses, and
wherein the interferometer is further configured to:
interfere the received sequences of slave light pulses with the delayed sequences of slave light pulses at the interference component, such that pulses from a received sequence interfere with adjacent pulses of the delayed sequence; and
output interfered pulses, wherein the interfered pulses comprise a first and a second output pulse that have a first and second predetermined amplitude respectively and a predetermined relative phase between them.

2. The optical source according to claim 1, wherein:
the second control signal comprises a periodic signal; and
the master light source is configured to intermittently generate master light pulses that are temporally separated by a second time interval, such that the generated sequences of slave light pulses comprise a periodic sequence of slave light pulses wherein any adjacent slave light pulses are temporally separated by the first time interval.

3. The optical source according to claim 2, wherein:
the interferometer is further configured to interfere a pulse from a received sequence that is generated when one master light pulse is received with a pulse from a delayed sequence that is generated when a subsequent master light pulse is received; and
the interfered pulses comprise a third output pulse that has a randomised amplitude.

4. The optical source according to claim 1, wherein the phase difference between the first output pulse and the second output pulse is determined from the first and second phase modulation features of the first control signal.

5. The optical source according to claim 1, wherein the first predetermined amplitude is determined from the first phase modulation feature of the first control signal.

6. The optical source according to claim 1, wherein the second predetermined amplitude is determined from a second phase modulation feature of the first control signal.

7. The optical source according to claim 1, wherein the first control signal is a voltage signal and the phase modulation features have voltage magnitudes of 1V or less.

8. The optical source according to claim 1, wherein the master light source is a gain-switched laser.

9. The optical source according to claim 1, wherein the slave light source is a gain-switched laser.

10. The optical source according to claim 1 wherein the master light source and the slave light source are integrated laterally on a first substrate.

11. The optical source according to claim 10 wherein the interferometer is integrated laterally on the first substrate.

12. A quantum communication system, comprising a transmitter, wherein the transmitter comprises the optical source according to claim 1.

13. The system according to claim 12, wherein the system further comprises a receiver, and wherein the receiver is optically coupled to the transmitter and the receiver is configured to receive light pulses from said transmitter.

14. The system according to claim 13, wherein the receiver comprises a second interferometer, wherein the second interferometer comprises a second interference component and a second delay element, wherein the delay element is configured to delay the received light pulses by the first time interval to form delayed light pulses, and wherein the second interferometer is further configured to interfere the received light pulses with the delayed light pulses at the second interference component to form receiver output pulses.

15. The system according to claim 12, wherein the first and second phase modulation features are configured to encode information in a first encoding basis in the amplitude of the first output pulse and the amplitude of the second output pulse.

16. The system according to claim 12, wherein the first and second phase modulation features are configured to encode information in a second encoding basis in the relative phase between e first output pulse and the second output pulse.

17. The system according to claim 12, wherein the first and second phase modulation features are configured to attenuate the amplitude of the first or second output pulse to encode a decoy state pulse.

18. The system according to claim 13, wherein:
the second control signal comprises a periodic signal;
the master light source is configured to intermittently generate master light pulses that are temporally separated by a second time interval, such that the generated sequences of slave light pulses comprise a periodic sequence of slave light pulses wherein any adjacent slave light pulses are temporally separated by the first time interval;
the interferometer is further configured to interfere a pulse from a received sequence that is generated when one master light pulse is received with a pulse from a delayed sequence that is generated when a subsequent master light pulse is received; and
the interfered pulses comprise a third output pulse that has a randomised amplitude,
wherein the receiver comprises a data processor, wherein the data processor is configured to measure detection statistics of the third output pulse, such that information about a quality of randomness of the output pulses can be inferred.

19. A method for generating optical pulses, the method comprising:
intermittently generating master light pulses using a master light source, wherein a phase of each generated master light pulse has a random relationship with a phase of each subsequently generated master light pulse;
applying a first control signal to the master light source such that the master light source intermittently generates master light pulses, wherein the first control signal comprises a first and a second phase modulation feature in a period of time that one master light pulse is generated, wherein each phase modulation feature comprises a perturbation in the control signal applied to the master light source;
receiving master light pulses in a slave light source, wherein the slave light source is optically coupled to the master light source;
applying a second control signal to the slave light source to cause the slave light source to generate a sequence of slave light pulses during each period of time that a master light pulse is received, such that the phase of a slave light pulse from the sequence has a random relationship to the phase of a light pulse from a subsequent sequence, and
wherein each sequence comprises a first, second and third slave light pulse that are temporally separated from one another by a first time interval and wherein phase differences between the first, second and third slave light pulses depend on the phase modulation features;
receiving sequences of slave light pulses in an interferometer, wherein the interferometer is optically coupled to the slave light source and comprises an interference component and a delay element, wherein the delay element is configured to delay the received sequences by the first time interval to form delayed sequences of slave light pulses, and
interfering the received sequences of slave light pulses with the delayed sequences of slave light pulses at the interference component, such that pulses from a received sequence interfere with adjacent pulses of the delayed sequence; and
outputting interfered pulses, wherein the interfered pulses comprise a first and a second output pulse that have a first and second predetermined amplitude respectively and a predetermined relative phase between them.

20. A quantum communication method comprising the method for generating optical pulses of claim 19.

* * * * *